(12) United States Patent
Alabdulkareem et al.

(10) Patent No.: US 12,450,540 B1
(45) Date of Patent: Oct. 21, 2025

(54) LARGE DECISION INTELLIGENCE MODEL SYSTEM AND METHOD

(71) Applicant: INTELMATIX HOLDING LTD, Grand Cayman (KY)

(72) Inventors: Ahmad Abdulmajeed Alabdulkareem, Riyadh (SA); Prasen Jit Singh, Cambridge, MA (US)

(73) Assignee: INTELMATIX HOLDING LTD, Grand Cayman (KY)

( * ) Notice: Subject to any disclaimer, the term of this patent is extended or adjusted under 35 U.S.C. 154(b) by 0 days.

(21) Appl. No.: 19/040,910

(22) Filed: Jan. 30, 2025

(51) Int. Cl.
| | |
|---|---|
| *G06Q 10/00* | (2023.01) |
| *G06F 9/451* | (2018.01) |
| *G06Q 10/0635* | (2023.01) |
| *G06Q 10/0637* | (2023.01) |
| *G06Q 10/087* | (2023.01) |
| *G06Q 30/0202* | (2023.01) |

(52) U.S. Cl.
CPC ......... *G06Q 10/0637* (2013.01); *G06F 9/451* (2018.02); *G06Q 10/0635* (2013.01); *G06Q 10/087* (2013.01); *G06Q 30/0202* (2013.01)

(58) Field of Classification Search
None
See application file for complete search history.

(56) References Cited

U.S. PATENT DOCUMENTS

| 5,930,762 A | * | 7/1999 | Masch | ................ G06Q 10/06 |
| | | | | 705/7.36 |
| 11,544,724 B1 | * | 1/2023 | Wick | ................ G06Q 30/0202 |
| | | | (Continued) | |

FOREIGN PATENT DOCUMENTS

CN        118586861 A      9/2024

OTHER PUBLICATIONS

Marco Comerio et al. (Web Service Contracts: Specification, Selection and Composition, Ph.D. Dissertation). (Year: 2010).*
(Continued)

*Primary Examiner* — Hafiz A Kassim
(74) *Attorney, Agent, or Firm* — Oblon, McClelland, Maier & Neustadt, L.L.P.

(57) ABSTRACT

A decision support system and a computer-implemented method of enterprise decision support include a data consolidation module, domain-specific machine learning models, an enterprise decision intelligence model, and a user interface layer. The data consolidation module collects data from both internal and external data sources. The domain-specific machine learning models generate decisions based on the collected data. The enterprise decision intelligence model integrates real-time trends and the decisions to provide context-aware recommendations. The enterprise decision intelligence model maintains a decision graph that connects decision variables of the domain-specific machine learning models in a causal relationship, with the domain-specific machine learning models interacting as an interconnected network. The decisions are influenced by affects of decision variables from other domain-specific machine learning models. The user interface layer facilitates interactive decision-making by way of the enterprise decision intelligence model and visualizing the recommendations.

18 Claims, 11 Drawing Sheets

(56) References Cited

U.S. PATENT DOCUMENTS

| | | | | |
|---|---|---|---|---|
| 11,715,042 B1* | 8/2023 | Liu | | G06N 3/006 |
| | | | | 705/26.1 |
| 11,790,268 B1* | 10/2023 | Wick | | G06N 5/04 |
| | | | | 706/12 |
| 12,141,727 B1* | 11/2024 | Thompson | | G06F 40/40 |
| 2003/0167265 A1* | 9/2003 | Corynen | | G06Q 10/04 |
| 2005/0049987 A1* | 3/2005 | Meek | | G06Q 30/02 |
| | | | | 706/50 |
| 2009/0037355 A1* | 2/2009 | Brave | | G06F 16/9535 |
| | | | | 706/45 |
| 2010/0077077 A1 | 3/2010 | Devitt | | |
| 2010/0185499 A1* | 7/2010 | Dwarakanath | | G06Q 10/04 |
| | | | | 705/7.31 |
| 2014/0121830 A1* | 5/2014 | Gromley | | G07G 1/01 |
| | | | | 700/236 |
| 2014/0310048 A1* | 10/2014 | Murray | | G06Q 10/06315 |
| | | | | 705/7.22 |
| 2015/0186154 A1* | 7/2015 | Brown | | G06Q 50/20 |
| | | | | 715/706 |
| 2017/0330205 A1* | 11/2017 | Belanger | | G06F 18/24155 |
| 2019/0130425 A1* | 5/2019 | Lei | | G06Q 30/0201 |
| 2019/0180190 A1 | 6/2019 | Chao et al. | | |
| 2019/0340516 A1* | 11/2019 | Kumar | | G06N 5/02 |
| 2019/0347590 A1 | 11/2019 | Rajasekaran et al. | | |
| 2019/0362290 A1* | 11/2019 | Rogynskyy | | G06F 16/235 |
| 2019/0379589 A1* | 12/2019 | Ryan | | G06F 17/142 |
| 2020/0126126 A1* | 4/2020 | Briancon | | G06N 20/20 |
| 2020/0234380 A1* | 7/2020 | Dulori | | G06Q 30/0283 |
| 2021/0012213 A1* | 1/2021 | Kim | | G06F 17/15 |
| 2022/0366494 A1* | 11/2022 | Cella | | H04L 9/50 |
| 2023/0153918 A1* | 5/2023 | Saxena | | G06N 5/04 |
| | | | | 705/30 |
| 2023/0368284 A1* | 11/2023 | Sheikh | | H04L 9/0618 |
| 2023/0376700 A1* | 11/2023 | Bista | | H04L 51/02 |

OTHER PUBLICATIONS

Ying Xie et al., "An integrated decision support system for ERP implementation in small and medium sized enterprises", Journal of Enterprise Information Management, vol. 27, No. 4, Feb. 10, 2013, pp. 358-384.

* cited by examiner

100

What is a good location for burger restaurant in south of Riaydh?

For opening a burger restaurant in the south of Riyadh, here are a few locations to consider that could attract a lot of customers:

1. ABC district

- Overview: This is a bustling residential area with plenty of local businesses, schools, and family-friendly zones. It's a growing area with increasing demand for fast food and casual dining options.

- Potential: With a mixture of families and young professionals, this area has good traffic and is likely to attract local residents looking for convenient dining options.

What is a good location for burger restaurant in south of Riaydh?

Choosing a great location for a burger restaurant in the south of Riyadh involves considering several factors to maximize visibility, accessibility, and potential customer traffic. Here are some prime locations and factors to consider in the southern area of Riyadh:

1. XYZ district

- Why: This district is known for its growing residential areas, meaning there's a steady demand for dining options among local residents.
- Features: High foot traffic, particularly on main roads with easy access from residential zones. The presence of nearby schools, shopping centers, and other dining options could also attract families and young adults.

> What is a good location for burger restaurant in south of Riaydh?

A promising location for burger restaurant in the south of Riyadh is the district of PQR. This area offers a balanced demographic with a total population of 1,194, a high population density, and a significant number of rented dwellings, which indicates a transient population likely to dine out frequently. The median age is 30, suggesting a youthful demographic, ideal for a burger chain. The area also has a moderate number of competing restaurants within a 3 km radius, providing a competitive yet manageable environment [4:8†data.json]. You can explore the location further on Maps.

FIG. 1G

LARGE DECISION INTELLIGENCE MODEL SYSTEM AND METHOD

BACKGROUND

Technical Field

The present disclosure is directed to an enterprise decision-making system that integrates data from multiple internal and external sources and applies specialized Artificial Intelligence (AI) models for each function in an enterprise to help with a decision-making process.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the fast-paced and data-driven business environment, enterprises face significant challenges when making complex, multi-level decisions. These challenges are often compounded by a presence of diverse data sources and rapidly changing contextual factors. Conventional enterprise decision-making tools, such as Enterprise Resource Planning (ERP) systems or standalone analytical platforms, struggle to provide cohesive insights that integrate multiple functional areas. Also, a decision-making process becomes inefficient and prone to misalignment, particularly when the insights are derived in silos, i.e., independent business departments that do not systematically share information.

Conventionally, various Decision Intelligence (DI) tools have been designed to address specific verticals or functions within an enterprise. Examples of Decision Intelligence tools include Silico, Sisense, Domo, Digital Enterprise Suite, Signavio, Tellius, Decisions, Federal Compas, Decisimo, Blue Ridge Global, Cerebra, to name a few. Silico is a Decision Intelligence Platform that facilitates the connection of Data, Actions, and Outcomes. Sisense is an AI-driven analytics cloud platform that goes beyond traditional BI, infusing intelligence into applications and workflows through its customizable Fusion technology. Domo is a cloud-native data experience platform that goes beyond traditional BI and analytics, making data visible and actionable. Although these tools may excel at generating actionable insights from raw data, they fail to consider a broader organizational context, leading to suboptimal decisions. Moreover, these tools lack an ability to dynamically adapt to real-time changes or integrate cross-functional insights, further limiting their utility in addressing modern enterprise challenges.

Artificial Intelligence (AI) is an approach that can offer solutions to the enterprise challenges. Large Language Models (LLMs) are designed to handle general-purpose tasks using text-based data. However, the LLMs often rely on historical and static data, which can result in outdated or irrelevant output. Moreover, the LLMs are often unsuitable for producing actionable insights tailored to organizational goals, as they fail to account for dynamic, real-time trends and cross-functional dependencies.

CN115027135A describes an AI-based enterprise management intelligent decision platform. The decision platform has various modules for data collection, preprocessing, analysis, visualization, decision support, and automation. While the decision platform offers comprehensive capabilities such as rule mining and automated decision-making, it does not explicitly address real-time data handling challenges or domain-specific optimizations required for specialized applications. Additionally, a reliance of the platform on a centralized architecture may pose scalability and integration limitations in complex and dynamic environments.

US20200334580A1 describes an intelligent decision support system that uses historical and annotated data to train the machine learning models. The system employs ensemble techniques for generating recommendations and engaging users through a dialog system. While the system offers robust functionalities like semantic analysis and natural language reasoning, it does not explicitly address challenges related to real-time data handling or the domain-specific optimizations for the specialized applications.

Solutions that are described in each of the aforementioned patent documents suffer from several limitations that hinder their broader adoption in enterprise decision-making systems. The teachings in these documents fail to provide the real-time data handling, or the domain-specific optimizations required for dynamic business environments. Further, the teachings in these documents do not support cross-functional needs within an enterprise. In addition, the teachings in these documents often rely on the static data or historical trends, making them unsuitable for addressing current and evolving business challenges. Therefore, these existing solutions lack the adaptability and precision necessary to drive optimal, real-time decision-making in modern enterprises.

Accordingly, it is one object of the present disclosure is to provide a system and a method for enterprise decision intelligence that delivers the actionable insights aligned with organizational goals while remaining scalable and flexible for integration with the existing systems.

SUMMARY

An exemplary implementation, referred to as 'Edix Advisor,' is an agentic decision intelligence platform that dynamically integrates cross-domain intelligence and real-time adaptability to empower decision-making in modern enterprises.

An aspect is an enterprise decision support system. The system includes processing circuitry configured with a data consolidation module to collect data from a plurality of internal data sources and at least one external data source that is external to an enterprise. The processing circuitry is further configured with a plurality of domain-specific machine learning models to generate respective domain-specific decisions using the collected data. The processing circuitry is additionally equipped with an enterprise decision intelligence model that dynamically incorporates real-time trends and outputs from multiple domain-specific machine learning models, leveraging decisions from at least two of these models to generate real-time, context-aware recommendations.

The enterprise decision intelligence model utilizes a decision graph to establish causal relationships between the decision variables of the domain-specific machine learning models, enabling these models to function as an interconnected network guided by the decision graph.

The domain-specific machine learning models generate the respective domain-specific decisions based on the effects of the decision variables from other domain-specific machine learning models. The processing circuitry is further equipped with a user interface layer that facilitates interactive decision-making through the enterprise decision intelligence model and enables visualization of the recommendations.

A further aspect is a computer-implemented method of enterprise decision support. The method includes collecting data from a plurality of internal data sources and at least one external data source that is external to an enterprise. The method further includes generating, by a plurality of domain-specific machine learning models, respective domain-specific outputs using the collected data. The method further includes dynamically incorporating, by an enterprise decision intelligence model, real-time trends and outputs from the plurality of domain-specific machine learning models, and leveraging the outputs from at least two of the domain-specific machine learning models to generate real-time, context-aware recommendations. The enterprise decision intelligence model utilizes a decision graph to establish causal relationships between decision variables of the domain-specific machine learning models, enabling the domain-specific machine learning models to operate as an interconnected network guided by the decision graph. The domain-specific machine learning models generate the decisions based on effects of the decision variables from other domain-specific machine learning models. The method further includes interacting with a user interface layer that facilitates interactive decision-making through the enterprise decision intelligence model and enables visualization of the recommendations.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of its attendant advantages thereof will be readily obtained as the same becomes better understood by reference to the following detailed description when considered in connection with the accompanying drawings, wherein:

FIG. 1A illustrates an exemplary response generated by a conventional language model interface.

FIG. 1B illustrates another exemplary response generated by the conventional language model interface.

FIG. 1G illustrates an exemplary interface displaying a response outputted from the enterprise decision intelligence model, according to certain embodiments.

DETAILED DESCRIPTION

Figure 1C:
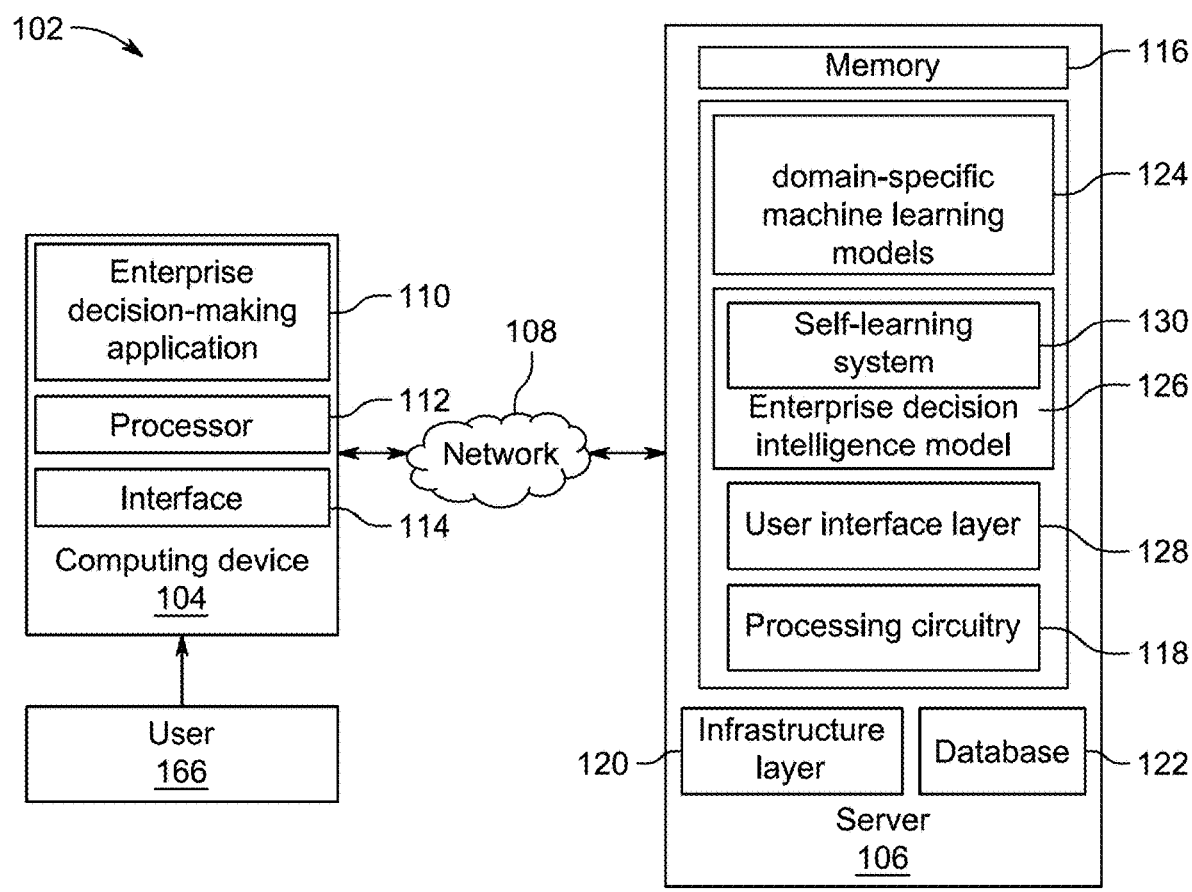
FIG. 1C illustrates a block diagram of an enterprise decision support system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the disclosure are directed to a system and a method for enterprise decision-making that integrates one or more domain-specific machine learning models with real-time data to generate context-aware and actionable recommendations. As used herein, the "domain-specific machine learning models" refer to specialized models trained to perform specific tasks within a particular domain by utilizing domain-specific data, features and knowledge. The domain may be, demand forecasting, inventory optimization, marketing, risk management, and the like. The system leverages a decision graph to model causal relationships among decision variables across interconnected models, ensuring decisions are influenced dynamically by cross-functional insights. The system addresses challenges such as fragmented decision-making, inefficiencies in integrating diverse data sources and the inability of existing systems to adapt to real-time changes. By integrating internal and external data sources along with dynamic trend data, the system enhances its ability to provide precise, timely, and scalable decision support by leveraging a comprehensive and up-to-date information base. Further, the system provides a user interaction layer that enhances user interaction by visualizing recommendations and facilitates collaborative decision-making, addressing misalignment and inefficiencies in complex enterprise environments.

FIG. 1A illustrates an exemplary response displayed in a language model interface 100. In an aspect, the language model interface 100 may be an interface for a Large Language Model (LLM). The language model interface 100 displays a first response to an input query. In the example in FIG. 1A, the query and response relate to finding a suitable location for a burger restaurant in the south of Riyadh. The first response demonstrates a single district, ABC, providing an overview and potential benefits of the district. However, the first response lacks domain-specific intelligence or decision-making accuracy tailored to enterprise use cases, such as comprehensive location analysis or cross-domain insights.

FIG. 1B illustrates another exemplary response generated by the language model interface 100. The language model interface 100 displays an example of a second response to the query about finding the suitable location for the burger restaurant in the south of Riyadh. The second response demonstrates a single district, XYZ, with a description that includes reasons for the suitability of the district, such as growing residential areas, steady demand and features like high foot traffic, proximity to schools, shopping centers, and so forth. However, the second response lacks the domain-specific intelligence, or the decision-making accuracy tailored to enterprise use cases.

FIG. 1C illustrates a block diagram of an enterprise decision support system 102 (hereinafter referred to as the system 102), according to certain embodiments. The system 102 includes a server 106. The computing device 104 and the server 106 are connected to each other through a network 108. Although the system 102 is shown with one computing device 104, it should be understood that the enterprise will include a number of computing devices 104 depending on how the enterprise is outfitted. The computing device 104 may collectively be referred to as the computing devices 104 and individually referred to as the computing device 104.

In an embodiment, the system 102 may be a distributed system with the computing devices 104 located in various departments in an organization. In an exemplary embodiment, the departments in the organization may be, but are not limited to, marketing, warehouse, management, and so forth. In another embodiment, the system 102 may be a centralized system with the computing devices 104 located in a single department in the organization.

Functionally, the system 102 can be configured to aggregate, cleanse and consolidate data from various data sources and create a comprehensive and accurate digital representation of an enterprise. The system 102 can be configured to employ Artificial Intelligence (AI) models to generate tailored recommendations for various enterprise functions. In an exemplary embodiment, the enterprise functions may be but are not limited to, marketing, inventory optimization, sales, and so forth. Embodiments of the present invention are intended to include or otherwise cover any type of the enterprise business functions, including known related art and/or later developed technologies.

Furthermore, the system 102 is configured to utilize customized algorithms that align with organizational goals. The customized algorithms optimize utility functions through reinforcement learning for precise and actionable insights. The system 102 is also configured to provide context-aware recommendations that integrate real-time trend data, enabling enterprises to make strategic and operational decisions effectively. As used herein, the context-aware recommendations refer to actionable decisions or suggestions generated by an enterprise decision intelligence model 126 that considers the real-time trends, enterprise-specific goals, constraints and dependencies between decision variables.

In an implementation, the computing device 104 may be configured to enable a user 166 to interact with the system 102 through an interface 114. The computing device 104 may also be configured to facilitate the visualization of insights (i.e., potential decision outcomes) and the context-aware recommendations on the interface 114. Further, the computing device 104 may be configured to enable the user 166 to provide inputs associated with a decision-making process. For example, the inputs may be, but are not limited to, adjusting decision-making parameters (i.e., expected demand, target inventory levels, and so forth), providing decision criteria (e.g., cost minimization, delivery optimization, etc.), contextual decision-making, and so forth.

The computing device 104 is also responsible for executing an enterprise decision-making application 110 (i.e., a software application) that interacts with the enterprise decision intelligence model 126 (i.e., Large Decision Intelligent Model (L-DIM)) for receiving the context-aware recommendations. The enterprise decision-making application 110 may be a computer readable program installed on the computing device 104 for executing functions associated with the system 102 on the computing device 104. In an exemplary embodiment, the enterprise decision-making application 110 may be implemented in the enterprise decision-making application 110. In other words, the enterprise decision-making application 110 may integrate the enterprise decision intelligence model 126 into the system 102, acting as an intermediary between the user 166 and the server 106. The enterprise decision-making application 110 is configured to collect the data from various data sources, feed the collected data into the enterprise decision-making application 110 and display actionable recommendations that help in optimizing the decisions across different functional domains. In an embodiment, the user 166 can log into the system 102 through the enterprise decision-making application 110 by providing login details such as, but not limited to, a username, a passcode, and so forth. Embodiments of the present invention are intended to include or otherwise cover any type of the login details that may be associated with the user 166. Upon login into the system 102, the user 166 may provide the inputs onto the system 102 using the enterprise decision-making application 110. In another embodiment, the user 166 logs into the system 102 through a web browser by providing the login credentials. In such embodiment, the user 166 provides the inputs onto the system 102 using the web browser upon login into the system 102.

The computing device 104 may be but are not limited to, a mobile device, a smart phone, a tablet, a portable computer, a laptop, a desktop, a smart device, and so forth. Embodiments are intended to include or otherwise cover any type of the computing device 104, including known, related art, and/or later developed technologies.

The computing device 104 includes a processor 112 and the interface 114. The processor 112 is configured to receive and/or transmit the collected data associated with the system 102 over the network 108. Further, the processor 112 is configured to process the data associated with the system 102. The processor 112 may be, but not limited to, a programmable logic control unit (PLC), a microcontroller, a microprocessor, a computing device, a development board, and so forth. Embodiments of the present invention are intended to include or otherwise cover any type of the processor 112, including known, related art, and/or later developed technologies.

The interface 114 is configured to enable the user 166 to interact with the enterprise decision-making application 110 installed within the computing device 104. The interface 114 may be further configured to display output data associated with the system 102. In an embodiment, the output data can include the context-aware recommendations, the insights and decision paths generated by the enterprise decision intelligence model 126. In an exemplary embodiment, the interface 114 enables the user 166 to input constraints such as budget constraints or inventory capacities. In another exemplary embodiment, the interface 114 enables the user 166 to adjust the decision-making parameters within different domain-specific machine learning models 124 (hereinafter collectively referred to as the domain-specific machine learning models 124 and individually referred to as the domain-specific machine learning model 124). For example, in urban planning, the decision-making parameters include traffic flow, resource availability, and so forth. In yet another exemplary embodiment, the interface 114 enables the user 166 to interact with the enterprise decision intelligence model 126 and the domain-specific machine learning models 124 through the enterprise decision-making application 110.

The interface 114 also enables the user 166 to enter overrides for operation of the enterprise decision intelligence model 126 to override the decisions by specific ones of the domain-specific machine learning models 124. For example, the user 166 may modify or reject the recommendations generated by the enterprise decision intelligence model 126 before execution of the recommendations in real-time.

In an exemplary embodiment, the interface 114 also enables the user 166 to simulate various decision scenarios using scenario analysis features to visualize the potential outcomes before taking any action. For example, if the user 166 adjusts the traffic flow or land usage in a planning model, the interface 114 visualizes how the adjusted decision-making parameters affect things like traffic, environmental impact, and so forth. In another exemplary embodiment, the interface 114 also enables the user 166 to query the enterprise decision-making application 110 conversationally. For example, the user 166 can ask the query like "what impact will an increase in marketing spending have on inventory?". The interface 114 includes a digital display, a touch screen display, a graphical user interface (e.g., interactive dashboard, forms), voice-based system, and so forth. Embodiments of the present invention are intended to include or otherwise cover any type of interface 114, including known, related art, and/or later developed technologies.

According to an embodiment, the network 108 may be a data network such as, but not limited to, the Internet, a Local Area Network (LAN), a Wide Area Network (WAN), a Metropolitan area network (MAN), and so forth. Embodiments of the present invention are intended to include or otherwise cover any type of the data network, including known, related art, and/or later developed technologies. In some embodiments, the network 108 may be a wireless network, such as, but not limited to, a cellular network and may employ various technologies including an Enhanced Data Rates for Global Evolution (EDGE), a General Packet Radio Service (GPRS), and so forth. Embodiments of the present invention are intended to include or otherwise cover any type of the wireless network, including known, related art, and/or later developed technologies.

In an embodiment, the server 106 is capable of storing, processing, and managing the data. In an exemplary embodiment, the server 106 utilizes a database 122 to store the data. The server 106 further employs processing circuitry 118 to process the data and manage the data through efficient storage and retrieval mechanisms.

The server 106 hosts the core logic of the enterprise decision intelligence model 126, which includes data processing, predictive modeling, and decision recommendation functions. The server 106 can also serve as a communication hub that sends and receives the data between the computing device 104 and external data sources 142, enabling a seamless flow of information across an organization.

The server 106 includes a memory 116, the processing circuitry 118, an infrastructure layer 120 and the database 122. The memory 116 may be a non-transitory data storage medium that is configured to store computer-executable instructions for controlling operations of the system 102. The memory 116 may be, but is not limited to, a Random-Access Memory (RAM) device, a Read Only Memory (ROM) device, a flash memory, and so forth. Embodiments of the present invention are intended to include or otherwise cover any type of the memory 116, including known, related art, and/or later developed technologies.

Further, the processing circuitry 118 is connected to the memory 116 to execute the computer-executable instructions to perform the operations associated with the system 102. The processing circuitry 118 may be, but not limited to, the programmable logic control unit (PLC), the microcontroller, the microprocessor, the computing device, the development board, and so forth. Embodiments of the present invention are intended to include or otherwise cover any type of the processing circuitry 118 including known, related art, and/or later developed technologies.

The processing circuitry 118 is configured with the domain-specific machine learning models 124 that are trained to generate localized decisions for corresponding enterprise domains. In an embodiment, the domain-specific machine learning models 124 may be, but are not limited to, a supervised learning model, an unsupervised learning model, a reinforcement learning model, a deep learning model, and so forth. Embodiments of the present invention are intended to include or otherwise cover any domain-specific machine learning models 124, including known related art and/or later developed technologies. In an embodiment, a working of the domain-specific machine learning models 124 is explained in detail in conjunction with FIG. 1D.

The system can be implemented in products such as 'Edix Advisor,' which leverages these components to provide actionable insights tailored to enterprise goals. 'Edix Advisor' represents an exemplary implementation, incorporating cross-domain intelligence and real-time adaptability for modern decision-making challenges. The implementation as 'Edix Advisor' exemplifies an agentic decision intelligence platform that autonomously learns, adapts, and refines decision-making processes, ensuring dynamic, real-time responses to evolving enterprise needs."

The processing circuitry 118 is also configured with the enterprise decision intelligence model 126 that enables the user 166 to make the accurate, real-time and context-aware recommendations by utilizing outputs (i.e., decisions) of the domain-specific machine learning models 124. A workflow of the enterprise decision intelligence model 126 is explained in detail in conjunction with FIG. 1D.

Further, the processing circuitry 118 is configured with a user interface layer 128. The user interface layer 128 is configured for interactive decision-making by way of the enterprise decision intelligence model 126 and visualizing the recommendations. In an embodiment, the user interface layer 128 serves as an engine behind the functionality of the interface 114, so that the decision is understandable and presented in an appropriate format for a user interaction. The user interface layer 128 is configured to receive the output data (i.e., recommendations/decisions) from the enterprise decision intelligence model 126 and the domain-specific machine learning models 124. Further, the user interface layer 128 is configured to process the output data into a predefined format to display on the interface 114 of the computing device 104. In an embodiment, the user interface layer 128 integrates the LLM to convert complex, technical outputs of the enterprise decision intelligence model 126 and the domain-specific machine learning models 124 into a user-friendly language, providing explanations of the decisions, the recommendations and the potential outcomes. The user interface layer 128 is also be configured to facilitate decision explainability by translating the logic of the domain-specific machine learning model 124 and reasoning to a plain language. The translated logic enables the user 166 to understand the reason behind each recommendation. In an exemplary embodiment, the user interface layer 128 utilizes natural language generation (NLG) to convert abstract machine learning (ML) reasoning to easy-to-understand sentences (plain language). Based on the domain, the NLG ensures that the explanation matches the recommendations.

The enterprise decision intelligence model 126 also includes a self-learning system 130 that has a feedback loop to capture the outcomes of the decisions by the domain-specific machine learning models 124. The enterprise decision intelligence model 126 uses the captured outcomes to refine model parameters of the domain-specific machine learning models 124. As used herein, the feedback loop is a mechanism where the outcomes of the decisions by the domain-specific machine learning models 124 are fed back into the corresponding domain-specific machine learning models 124. For example, when the domain-specific machine learning models 124 generate the decision (e.g., adjusting inventory levels), an actual outcome (e.g., did the adjustment result in reduced stockout or higher cost?) is tracked to determine whether the decision led to the actual outcome. The tracked actual outcome may be compared with an expected outcome. If the enterprise decision intelligence model 126 determines that the actual outcome deviates from the expected outcome, then the enterprise decision intelligence model 126 refines the parameters of the corresponding domain-specific machine learning models 124.

In an embodiment, the self-learning system 130 uses real-time data monitoring tools to track Key Performance Indicators (KPIs) such as sales figures, inventory levels, or production efficiency of the decision for capturing the outcomes of the decisions. In another embodiment, the self-learning system 130 collects and analyzes various data recordings, transactional records, or user behavior logs to determine the outcomes of the decisions.

The infrastructure layer 120 is connected to the processing circuitry 118. The infrastructure layer 120 is configured to manage the domain-specific machine learning models 124, which ensures that a correct version of the domain-specific machine learning model 124 is configured in the processing circuitry 118. The infrastructure layer 120 is configured to detect a data drift in the collected data and retrain the domain-specific machine learning models 124. In an exemplary embodiment, the infrastructure layer 120 is configured to detect the data drift in the collected data by using at least one monitoring tool such as, Prefect monitoring tool, Machine Learning (ML) Flow, and so forth. The at least one monitoring tool may be configured to monitor the data that is collected from the data sources. The monitoring tool can continuously track data characteristics such as statistical properties (i.e., correlation between features of the data), distributional changes, feature behavior, and so forth. The infrastructure layer 120 is configured to compare the collected data to a historical data distribution by using various statistical methods such as but not limited to, Kolmogorov-Smirnov (KS) test, Kullback-Leibler (KL)-divergence, and so forth. In an exemplary embodiment, the Kolmogorov-Smirnov test may be a non-parametric statistical test used to compute an empirical cumulative distribution function (ECDF) for the collected data. Further, the ECDF of the collected data is compared with the historical data distribution. Further, the KS test calculates maximum absolute differences between the ECDF and cumulative distribution function (CDF) of the historical data distribution. The maximum difference serves as a test statistic to quantify how much the two distribution changes. In another exemplary embodiment, the KL-divergence quantifies a divergence between probability distributions, helping detect the data drift by comparing the distribution of the collected data with the historical data distribution. For example, a higher KL divergence value indicates significant data drift.

The infrastructure layer 120 may be configured to detect the data drift in the collected data if the collected data deviates from the historical data distribution. The infrastructure layer 120 is further configured to trigger a retraining process for affected domain-specific machine learning models 124 if the data drift is detected in the collected data. The infrastructure layer 120 is configured to retrain the affected domain-specific machine learning models 124 by collecting updated data from the data sources. Further, the infrastructure layer 120 is configured to retrain the affected domain-specific machine learning models 124 using the updated data to ensure that the affected domain-specific machine learning models 124 perform well on new information. In an embodiment, the infrastructure layer 120 is configured to evaluate the retrained domain-specific machine learning models 124 for performance, ensuring that the retrained domain-specific machine learning models 124 are handling the new information effectively.

In an embodiment, the database 122 is configured to store the data collected from the data sources. The database 122 is also configured to store the domain-specific machine learning models 124 and the enterprise decision intelligence model 126. The database 122 is also configured to store domain-specific historical data and historical enterprise data including interactions and causal relationships between the enterprise domains. According to embodiments of the present invention, the database 122 may be, but is not limited to, a centralized database, a distributed database, a personal database, an end-user database, a commercial database, a structured query language (SQL) database, a non-SQL database, an operational database, a relational database, a cloud database, an object-oriented database, a graph database, and so forth. Embodiments of the present invention are intended to include or otherwise cover any type of the database 122, including known, related art, and/or later developed technologies that may be capable of data storage and retrieval.

Figure 1D:
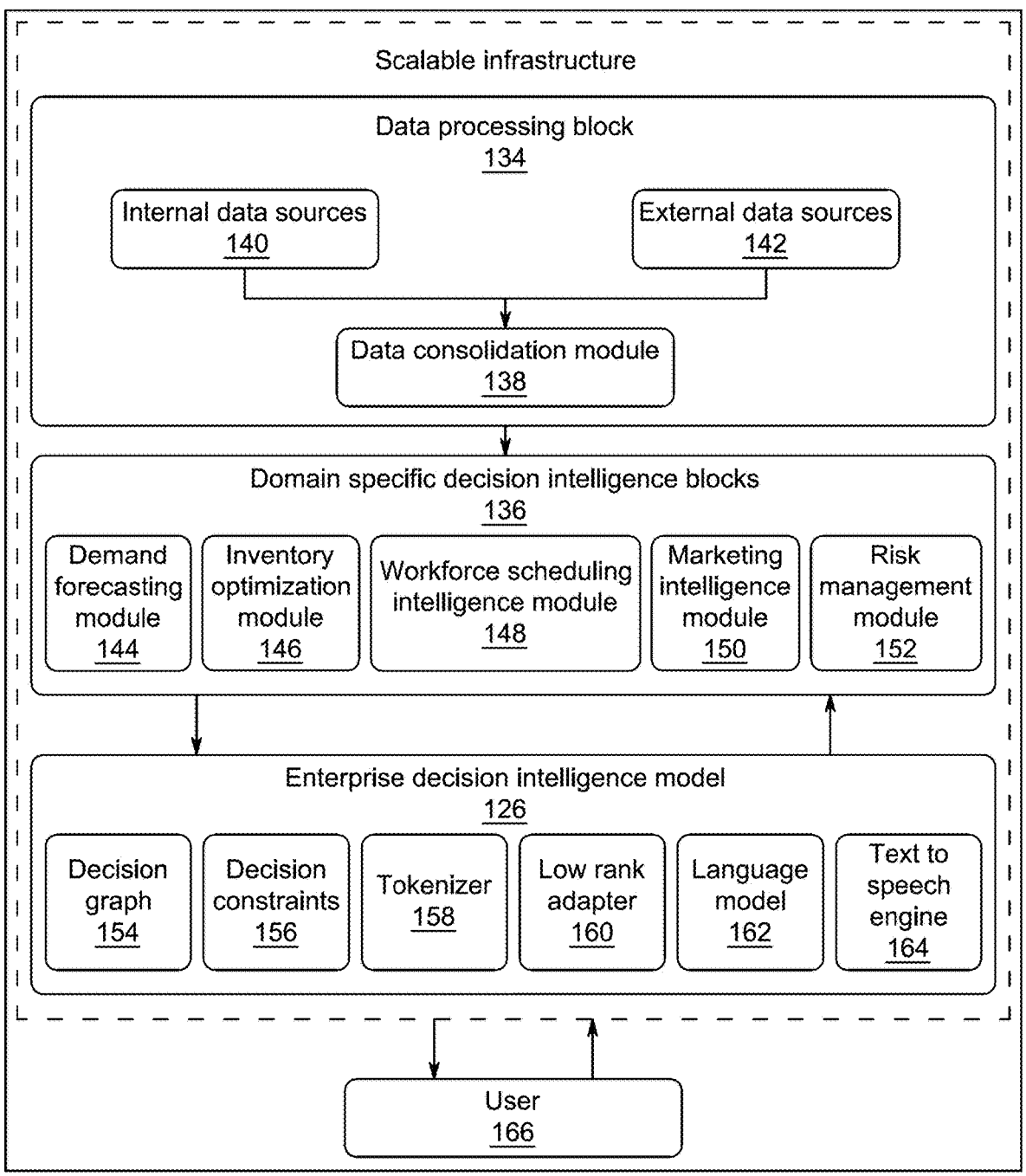
FIG. 1D illustrates an exemplary high-level system architecture, according to certain embodiments.

FIG. 1D is a block diagram of an exemplary software system architecture 132, according to certain embodiments. In an aspect, the system architecture 132 is designed to be scalable, enhancing an enterprise decision-making process. The system architecture 132 includes a data processing block 134, domain-specific decision intelligence blocks 136 (hereinafter collectively referred to as the domain-specific blocks 136 and individually referred to as the domain-specific block 136), and the enterprise decision intelligence model 126.

The data processing block 134 may be designed to serve as a foundation for decision intelligence by collecting and processing the data from the data sources such as, different internal data sources 140 (hereinafter collectively referred to as the internal data sources 140 and individually referred to as the internal data source 140) and at least one external data source 142 (hereinafter collectively referred to as the external data sources 142 and individually referred to as the external data source 142). The external data sources 142 are external to the enterprise. The data processing block 134 includes a data consolidation module 138 that is configured to collect, clean, transform and prepare the data for decision-making. In an exemplary embodiment, the internal data sources 140 provide structured business data such as, but not limited to, inventory data, financial data, customer data, sales data, and so forth. The internal data sources 140 may be, but are not limited to, Enterprise Resource Planning (ERP), Customer Relationship Management (CRM), Internet of Things (IoT), and so forth. Embodiments of the present invention are intended to include or otherwise cover any type of the internal data sources 140. Further, in an exemplary embodiment, the external data sources 142 provide information generated outside the organization and essential for identifying trends and making the decisions. The information received from the external data sources 142 may be, but are not limited to, weather data, mobility trends, economic indicators (i.e., inflation rates, Gross Domestic Product (GDP) growth, etc.), and so forth. The external data sources 142 may be, but are not limited to, government reports, weather agencies, environmental Application Programming Interfaces (APIs), social media platforms, and so forth. Embodiments of the present invention are intended to include or otherwise cover any type of the external data sources 142.

In an embodiment, the data consolidation module 138 is configured to collect the data from the internal data sources 140 and the external data sources 142 through a connector(s). In an exemplary embodiment, the connectors are software components or APIs facilitating communication between the data sources (i.e., the internal data sources 140 and the external data sources 142) and the data consolidation module 138. The connectors act as intermediaries that Extract, Transform and Load (ETL) the data from the internal data sources 140 and the external data sources 142 to a unified format. For example, Enterprise Resource Planning (ERP) connectors may be used for retrieving supply chain data and external Application Programming Interfaces (APIs) connectors may be used to collect contextual data like market trends.

The data consolidation module 138 is configured to establish a connection with the internal data sources 140 and the external data sources 142 using the connectors. In an exemplary embodiment, the data consolidation module 138 is configured to establish the connections with the internal data sources 140 through the connectors such as, but are not limited to, internal APIs, Java Database Connectivity (JDBC) connections, proprietary interfaces, and so forth. In another exemplary embodiment, the data consolidation module 138 is configured to establish a secure connection with the external data sources 142 through the connectors such as Representational State Transfer (RESTful) APIs, Simple Object Access Protocol (SOAP) APIs, cloud platform connections, and so forth.

Upon establishing the connection, the data consolidation module 138 is configured to send a request to each of the internal data sources 140 and the external data sources 142 through the connectors. In an exemplary embodiment, the connectors format the request before sending the request to the corresponding internal data source 140 and the external data source 142. In such an exemplary embodiment, the connectors format the request based on a protocol or an API standard required by the corresponding internal data source 140 and the external data source 142.

For example, Hypertext Transfer Protocols (HTTP) requests are transmitted from the data consolidation module 138 to the internal APIs (i.e., internal data sources 140) for requesting the data. In another example, the request is transmitted from the data consolidation module 138 to the internal data sources 140 by executing Structured Query Language (SQL)-based queries.

Similarly, for the external data sources 142, HTTP/HTTPS requests are transmitted from the data consolidation module 138 to the external APIs. In another example, the requests are transmitted from the data consolidation module 138 to the cloud platforms through the specific connectors.

Upon receiving the request, the corresponding internal data source 140 or the external data source 142 process the received request and prepare the requested data. Further, the corresponding internal data source 140 or the external data source 142 transmit the requested data to the data consolidation module 138 through the connectors, where the connectors translate the requested data into a format compatible with the domain-specific machine learning model 124. For example, the data received from the external API are in a JavaScript Object Notation (JSON) format, and the connector converts the data into a structured format before transmitting the data to the data consolidation module 138.

In an exemplary embodiment, the collected data is historical data. In another exemplary embodiment, the collected data is real-time data. The historical data is used for training the domain-specific machine learning models 124 and the real-time data is used for making adjustments in the decision-making process.

The data consolidation module 138 is further configured to preprocess the collected data to clean, normalize and standardize the data for maintaining the quality and context of the data. In an embodiment, the collected data is preprocessed for removing errors, duplicates, inconsistencies, and so forth by using data cleaning techniques. In such embodiment, the errors, the duplicates, the inconsistencies, and so forth are removed by handling missing values, outliers, and noisy data points in the collected data. The data cleaning techniques may be, but are not limited to, statistical techniques, smoothing techniques, filtering techniques, and so forth. Embodiments of the present invention are intended to include or otherwise cover any type of the data cleaning techniques, including known, related art, and/or later developed technologies.

Further, in an embodiment, the collected data is normalized to ensure consistency and comparability by using normalization techniques. In an exemplary embodiment, the normalization of the collected data involves rescaling the data, feature scaling of the data, and so forth. In an embodiment, the normalization techniques may be, but not limited to, a min-max scaling, a z-score standardization, and so forth. Embodiments of the present invention are intended to include or otherwise cover any type of the normalization techniques, including known, related art, and/or later developed technologies.

The data consolidation module 138 is further configured to combine the data from multiple domains (e.g., sales, inventory, marketing, and the like) to create a unified dataset. The data consolidation module 138 is configured to store the unified dataset in the database 122 (as shown in FIG. 1C). Further, the data consolidation module 138 is configured to perform dimensionality reduction and feature extraction on the collected data to optimize the data for model training and analysis. In an embodiment, the dimensionality reduction is performed on the data to reduce a number of input variables in the data. The dimensionality reduction may be performed using various dimensionality reduction techniques such as, but not limited to, Principal Component Analysis (PCA), t-distributed Stochastic Neighbor Embedding (t-SNE), autoencoders, and so forth. Embodiments of the present invention are intended to include or otherwise cover any dimensionality reduction techniques, including known related art and/or later developed technologies. For example, retail enterprises track hundreds of product attributes such as color, size, weight, demand fluctuations, and so forth. However, the PCA may reduce the number of product attributes to important product attributes like price sensitivity and popularity.

In an exemplary embodiment, the data consolidation module 138 is configured to perform the feature extraction on the collected data to extract domain-specific features using feature extraction techniques. For example, for a demand forecasting domain, relevant features include historical sales, seasonal trends, and so forth. For an inventory optimization domain, the relevant features include stock levels, supplier lead times, and so forth. The feature extraction techniques may be, but are not limited to, statistical methods, wrapper methods, embedded methods, and so forth. Embodiments of the present disclosure are intended to include or otherwise cover any type of the feature extraction techniques, including known related art and/or later developed technologies. In an embodiment, the data consolidation module 138 is configured to transmit the domain-specific features (i.e., domain-specific data) to the corresponding domain-specific blocks 136. In another embodiment, the data consolidation module 138 is configured to store the extracted domain-specific features in the database 122. For example, for the inventory optimization domain, the economic indicators like inflation rates are excluded from the data and stock-level data is stored corresponding to the inventory optimization domain in the database 122.

In an embodiment, the domain-specific blocks 136 fetch the collected data from the database 122. In another embodiment, the domain-specific blocks 136 receive the collected data directly from the data consolidation module 138. Further, the domain-specific blocks 136 utilize the domain-specific machine learning model 124 (as shown in FIG. 1C) for generating domain-specific decisions using the collected data. The collected data includes the domain-specific features relevant to the corresponding domain-specific machine learning model 124. The domain-specific decisions may be, but are not limited to, demand forecasting, inventory optimization, workforce scheduling, market insights and targeting, risk management, and so forth.

In an exemplary embodiment, each domain-specific machine learning model 124 is configured to apply learned patterns to analyze the domain-specific features for generating the domain-specific decisions. For example, the domain-specific machine learning model 124 such as, a time series forecasting model or a regression model learns patterns from the historical data to forecast future values. In another example, the domain-specific machine learning model 124, such as the classification model, learns the patterns to distinguish between categories in the data. In yet another example, the domain-specific machine learning model 124 learns the patterns to detect deviations from normal behavior to generate risk alerts.

In an embodiment, the domain-specific machine learning models 124 is trained by using the domain-specific historical data stored in the database 122. In an exemplary embodiment, a connection may be established with the database 122 for retrieving the domain-specific historical data. In such exemplary embodiment, the connection is established with the database 122 upon receiving a command to initiate a model training from the computing device 104 (as shown in FIG. 1C). In an embodiment, the connection is managed by an interface that enables an efficient transfer. Upon establishing the connection with the database 122, a query specifying historical data required for the model training is generated and transmitted to the database 122 for retrieving the domain-specific historical data.

Further, the domain-specific machine learning model 124 is selected for the domain-specific tasks using a model selection technique. The model selection technique may be, but is not limited to, a grid search, a random search, a Bayesian information criterion, and the like. Embodiments of the present invention are intended to include or otherwise cover any type of the model selection technique, including known related art and/or later developed technologies. For example, the time series forecasting model may be selected for tasks that involve sequential data like the demand forecasting. Similarly, an optimization model is selected for problems that require cost minimization, like the inventory optimization.

Further, in an embodiment, the selected domain-specific machine learning model 124 is configured with a set of initial parameters by using various techniques of initial parameter configuration such as, but are not limited to, Heuristic-based initialization, predefined default parameters, domain-specific templates, and so forth. The initial parameters depend on a type of the domain-specific machine learning model 124. For example, seasonal period and auto-regression order are the initial parameters of the time-series forecasting model and constraints and objective function weights are the initial parameters of the optimization model.

Further, the domain-specific machine learning models 124 may be trained by feeding training data, including input data (i.e., the domain-specific historical data) and corresponding expected output data. In an exemplary embodiment, the time-series forecasting model is trained using historical sales and market data for the demand forecasting domain. Similarly, in another exemplary embodiment, the optimization model is trained on supply chain and storage cost data for the inventory optimization domain.

The domain-specific blocks 136 (i.e., the domain-specific machine learning models 124) include a demand forecasting module 144, an inventory optimization module 146, a workforce scheduling intelligence module 148, a marketing intelligence module 150, a risk management module 152, a dispatchment intelligence module (not shown) and so forth.

Further, the demand forecasting module 144 uses the domain-specific machine learning model 124 to generate demand decisions (i.e., domain-specific decisions) based on historical sales data, seasonal trends (e.g., external factors like holidays, economic indicators) and market events (e.g., current market conditions such as price changes). In an exemplary embodiment, the domain-specific machine learning model 124 is trained using demand-specific features. Here, the demand-specific features such as the historical sales data, the seasonal trends and the market events are provided to the domain-specific machine learning model 124 for generating the demand decisions. For example, a demand-specific machine learning model predicts an x % increase in the demand for summer clothes using the demand-specific features such as past seasonal sales, regional preferences and climate forecasts.

The inventory optimization module 146 uses the domain-specific machine learning model 124 to identify optimal inventory levels (i.e., the domain-specific decision) based on storage costs, lead times and demand forecasts. In an exemplary embodiment, the domain-specific machine learning model 124 is trained using inventory-specific features. Here, the inventory-specific features such as the storage costs, the lead times and the demand forecasts are provided to the domain-specific machine learning model 124 for predicting the optimal inventory levels. For example, a retail enterprise uses the inventory optimization module 146 to predict a required stock for a product during a holiday season. The inventory optimization module 146 may utilize an inventory-specific machine learning model considering the inventory-specific features such as holiday sales data in the last year, current lead times for suppliers and storage constraints due to limited warehouse space for suggesting an optimal reorder quantity to ensure availability while minimizing the cost.

The workforce scheduling intelligence module 148 uses the domain-specific machine learning model 124 to generate scheduling decisions (i.e., the domain-specific decisions) based on task demand, employee availability and operational priorities (e.g., task backlogs or sudden spikes in the demand). In an exemplary embodiment, the domain-specific machine learning model 124 is trained using workforce-specific features. Here, the workforce-specific features such as the task demand, the employee availability and the operational priorities are provided to the domain-specific machine learning model 124 for generating the scheduling decisions. For example, a workforce-specific machine learning model generates the decision to schedule additional employees during peak shopping hours based on the workforce-specific features such as the demand and employee skill set.

The marketing intelligence module 150 uses the domain-specific machine learning model 124 to generate marketing-related decisions (i.e., the domain-specific decisions) based on customer demographics, campaign performance and so forth. In an exemplary embodiment, the domain-specific machine learning model 124 is trained using marketing-specific features. Here, the marketing-specific features such as the customer demographics and the campaign performance are provided to the domain-specific machine learning model 124 for generating the marketing-related decisions. For example, a marketing-specific model allocates 30% of marketing budget to digital advertisements based on the marketing-specific features such as regional buying trends.

The risk management module 152 uses the domain-specific machine learning model 124 to generate risk detection and mitigation decisions (i.e., domain-specific decisions) based on weather patterns, supply chain reliability and so forth. In an exemplary embodiment, the domain-specific machine learning model 124 is trained using risk-specific features. Here, the risk-specific features such as the weather patterns and the supply chain reliability are provided to the domain-specific machine learning model 124 for generating the marketing-related decisions. For example, a risk-specific model detects a likelihood of supplier delays due to a transport strike and decides to pre-order additional stock from an alternate supplier to prevent disruption.

Figure 1E:
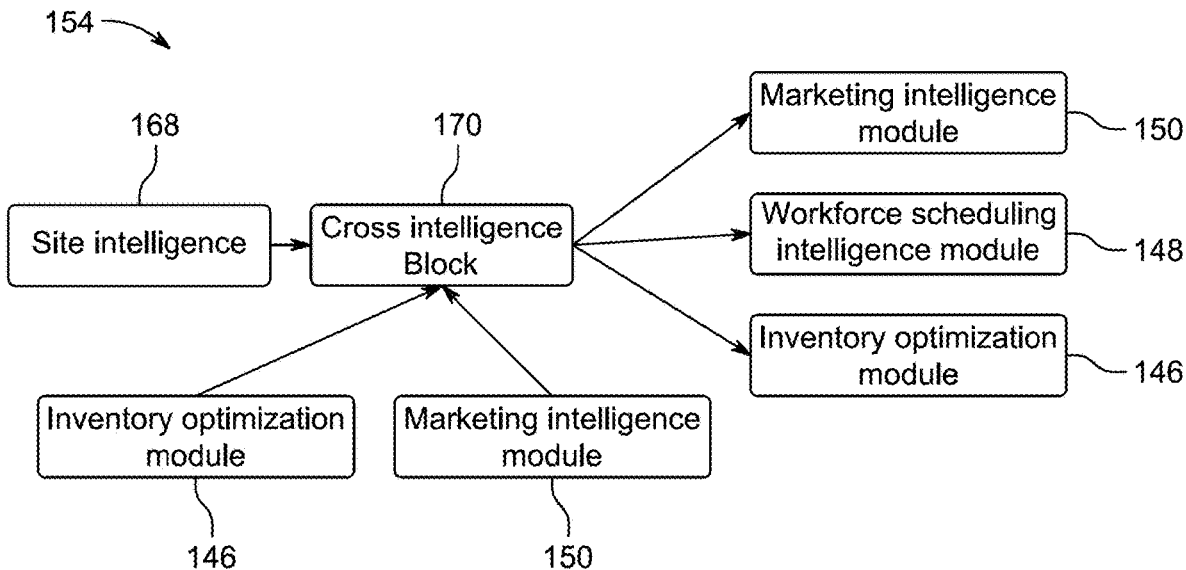
FIG. 1E illustrates a decision graph employed within the enterprise decision support system, according to certain embodiments.

In an embodiment, a cross-intelligence block 170 (as shown in FIG. 1E) is employed that enables interactions within the domain-specific blocks 136 to facilitate enterprise-wide decision making. The interaction between the domain-specific blocks 136 ensures that decisions in one domain, such as the demand forecasting module 144, are dynamically informed by insights from other domains like the inventory optimization module 146, the marketing intelligence module 150, and the workforce scheduling intelligence module 148, enabling enterprise-wide alignment across operational verticals such as market, assets, operations, workforce, offerings, and performance.

For example, when the risk management module 152 detects a supply chain risk, the cross-intelligence block 170 alerts the inventory optimization module 146 to adjust the inventory levels.

The cross-intelligence block 170 is configured to enable the domain-specific blocks 136 to function as an interconnected network, ensuring that every decision considers potential impacts across organizational functions. For example, the demand forecasting module 144 generates a demand decision that affects actions in the inventory optimization module 146 by transmitting forecast insights and necessary inventory adjustments in accordance with a decision graph 154.

In an embodiment, the cross-intelligence block 170 is configured to enable the interactions within the domain-specific blocks 136 by using triggers and signals. The triggers initiate actions within or across the domain-specific blocks 136 based on specific conditions, such as changes in market demand or inventory status. In an exemplary embodiment, the triggers may be, but are not limited to, data triggers, analysis triggers, decision triggers, and so forth. The data triggers may be metrics such as the stock levels that initiate immediate actions. The analysis triggers may involve deeper insights, like marketing campaign effectiveness, activating other domain-specific blocks 136 to align with market responsiveness. The decision triggers may represent strategic actions, such as launching a new product, which requires synchronization across the departments.

The signals communicate updates across the domain-specific blocks 136. The signals may be, but are not limited to, data signals, analysis signals, decision signals, and the like. The data signals provide real-time updates on metrics like the inventory levels or the market trends. The analysis signals deliver the insights, such as projected demand changes, across relevant domain-specific blocks 136. The decision signals communicate the outcomes or planned actions, ensuring synchronized strategy across domain functions.

Further, the enterprise decision intelligence model 126 is configured to receive the generated domain-specific decisions from the domain-specific blocks 136. The enterprise decision intelligence model 126 is configured to dynamically integrate real-time trends and the decisions generated by the domain-specific machine learning models 124, enabling organizations to make timely and actionable decisions based on continuously evolving conditions. In an exemplary embodiment, the real-time trends are determined from a continuous stream of real-time data collected from the internal data sources 140 and the external data sources 142. The collected real-time data is analyzed by using machine learning models to identify real-time trends such as immediate insights, patterns, changes, and so forth. For example, in the market data, live sales metrics or stock movements are analyzed by using the machine learning models to identify sudden spikes in product purchases on electronic (e)-commerce platforms.

The enterprise decision intelligence model 126 uses the decisions generated by two or more domain-specific machine learning models 124 to determine real-time, context-aware recommendations. In an exemplary embodiment, the enterprise decision intelligence model 126 uses a tokenizer 158 to tokenize the domain-specific decisions into smaller and manageable tokens. By tokenizing the decisions, the enterprise decision intelligence model 126 may be able to interpret and combine the decisions into a unified format by using techniques such as, but not limited to, weighted average, rule-based logic, meta-learning models, and so forth. Further, the enterprise decision intelligence model 126 may be configured to evaluate the combined decisions based on current enterprise conditions (i.e., external factors) such as the real-time trends, to generate the context-aware recommendations that are actionable and relevant.

In another exemplary embodiment, the enterprise decision intelligence model 126 is configured to analyze dependencies between the decisions across different functional areas. Further, the enterprise decision intelligence model 126 is configured to combine the decisions that are contextually relevant and align with the enterprise-specific goals and constraints to generate the context-aware recommendations.

In an embodiment, the enterprise decision intelligence model 126 incorporates decision constraints 156, such as budget limits, resource availability, and so forth, when combining the decisions generated by the domain-specific machine learning models 124. The decision constraints 156 ensure that the recommendations are optimized based on the real-time data and comply with predefined enterprise policies, rules and limitations.

The enterprise decision intelligence model 126 maintains the decision graph 154 that relates the decision variables of the domain-specific machine learning models 124 in a causal relationship. The enterprise decision intelligence model 126 enables the domain-specific machine learning models 124 to operate as the interconnected network based on the decision graph 154. As used herein, the term "decision variables" may refer to adjustable factors within the domain-specific machine learning models 124 that directly influence the decision-making processes and outcomes. In an exemplary embodiment, the decision graph 154 is used to map a flow of the decisions across the domain-specific blocks 136. The decision graph 154 may illustrate interdependencies between the decisions generated by the domain-specific machine learning models 124. For example, the decision graph 154 illustrates how the inventory levels impact the workforce scheduling.

The causal relationships indicate that a change in one decision variable affects another decision variable. In a preferred embodiment, the decision graph 154 is structured as a directed acyclic graph (DAG), where a direction of edges signifies causality, indicating that a change in one decision variable causes an effect in another decision variable.

Further, in an embodiment, the decision variables are represented as nodes in the decision graph 154, and the causal relationships between the decision variables are represented as edges. In an exemplary embodiment, each node in the decision graph 154 corresponds to an important decision variable in the decision-making process. In an exemplary embodiment, a node represents the stock levels, the marketing campaign effectiveness, or workforce availability and directed edges between the nodes indicate causal links. For instance, an increase in stock levels (i.e., Node A) leads to an increased need for a workforce (i.e., Node B), implying that the Node A causes changes in the Node B.

In an embodiment, the enterprise decision intelligence model 126 learns the causal relationships through structure learning techniques. In an exemplary embodiment, the structure learning techniques include machine learning techniques used to determine the causal relationships and dependencies between the decision variables. The structure learning techniques may be, but are not limited to, score-based methods, constraint-based methods, Bayesian network learning, hybrid methods, and so forth. Embodiments of the present invention are intended to include or otherwise cover any structure learning techniques.

In an embodiment, the enterprise decision intelligence model 126 is configured to continuously utilize the structure learning techniques to discover and update the decision graph 154. In an exemplary embodiment, the enterprise decision intelligence model 126 is configured to analyze the historical data collected from various data sources to determine the dependencies between the decision variables. For instance, in the enterprise, the data about the inventory levels, the sales figures, the customer behavior, and so forth are examined to identify how changes in one decision variable (i.e., the inventory levels) affect other decision variables (i.e., demand forecasting).

Further, the enterprise decision intelligence model 126 utilizes the historical data to determine the decision variables that can significantly influence the enterprise goals. For instance, by analyzing past marketing campaigns, the sales data, economic trends, and so forth, the enterprise decision intelligence model 126 learns that certain decision variables such as the marketing spending or the inventory levels have a substantial effect on the enterprise goals such as, the cost reduction, the inventory optimization and the demand forecasting.

Suppose the enterprise is trying to optimize the inventory levels. By analyzing the historical data, the enterprise decision intelligence model 126 observes that a high stock level (Node A) leads to higher storage costs (Node B) but avoids stockouts (Node C), while increasing marketing spending (Node D) causes a spike in demand (Node E). Based on the analysis, the enterprise decision intelligence model 126 is configured to update the decision graph 154 to reflect the causal relationships and use the updated decision graph 154 to simulate scenarios where reducing stock levels may be more beneficial.

The enterprise decision intelligence model 126 is further configured to determine the affects of the decision variables by using causal inference techniques. The causal inference techniques are a set of statistical techniques used to determine whether and how the action of one decision variable causes changes in another decision variable. The causal inference techniques are used to establish cause-and-effect relationships, allowing the user 166 to make predictions about what might happen if one decision variable is altered. In a preferred embodiment, the DAG is one example of the causal inference technique.

The causal inference techniques are used to analyze the relationship between different decision variables, which further helps predict the potential effects of a specific action on the system 102. For instance, if the marketing intelligence module 150 generates the decision to increase the marketing spending, then the enterprise decision intelligence model 126 utilizes the causal inference technique to estimate a causal effect of the decision to increase the marketing spending on the demand and the inventory levels in the demand forecasting module 144 and the inventory optimization module 146, respectively. Therefore, based on the effects of the decision variables, the domain-specific machine learning models 124 generate the respective domain-specific decisions from other domain-specific machine learning models 124.

In another embodiment, the causal inference techniques are also used to simulate different scenarios. For example, what would happen if the company increased the marketing budget by 20% instead of 10%. The enterprise decision intelligence model 126 assesses the causal impact on sales and inventory, allowing the enterprise to adjust before actual implementation.

Further, the enterprise decision intelligence model 126 is configured to perform a utility function that defines criteria that the outcome of the decision is optimized by a decision intelligence module. As used herein, the "utility function" refers to a mathematical representation that assigns scores to the outcomes of the decisions based on importance and alignment with the enterprise goals. In an exemplary embodiment, the affects of the decision variables that are determined using the causal inference techniques are input to the utility function that assigns the scores based on the enterprise goals. In an embodiment, the utility function defines the criteria for optimization. The criteria include the enterprise goals such as the cost reduction, preventing shortages, and so forth. The enterprise decision intelligence model 126 is configured to evaluate the outcomes of the decisions based on the criteria. Based on the evaluation, the enterprise decision intelligence model 126 is configured to select the decision that maximizes the utility or meets the criteria, ensuring optimal inventory management.

For example, in the inventory optimization module 146, the criteria is defined as "minimizing holding costs while ensuring sufficient stock to meet demand." The outcome of a first decision is maintaining high stock levels, and the outcome of a second decision is keeping minimal stock levels. The enterprise decision intelligence model 126 is configured to calculate the utility scores using the utility function for both the decisions based on predicted demand, holding costs, and stockout penalties. Further, if the enterprise decision intelligence model 126 determines that the first decision delivers a higher utility based on the utility scores, then the enterprise decision intelligence model 126 selects the first decision.

The enterprise decision intelligence model 126 includes algorithms for the utility function that are used to assess an expected utility in terms of the enterprise goals and simulate potential scenarios to optimize decision policies. In a preferred embodiment, the algorithms include reinforcement learning algorithms. In an exemplary embodiment, the enterprise decision intelligence model 126 is configured to evaluate and optimize the outcomes of the decisions in alignment with the enterprise goals by using the algorithms. By simulating multiple scenarios, the enterprise decision intelligence model 126 identifies a decision policy that maximizes the expected utility. For example, the enterprise decision intelligence model 126 uses scenario simulation to predict how the decisions will perform under various conditions. By simulating multiple decision paths, the enterprise decision intelligence model 126 assesses their respective impacts on the utility function and identifies an optimal decision policy (i.e., a set of rules or actions guiding decision-making). The enterprise decision intelligence model 126 optimizes the decision policies by comparing the simulated outcomes and selecting the one that maximizes the expected utility, ensuring alignment with the enterprise goals.

The enterprise decision intelligence model 126 maps out decision paths by a decision tree, guided by the utility scores determined by the utility function, for generation of optimal recommendations. As used herein, the decision tree is a visual and logical structure where the decisions are represented as nodes, and branches represent possible outcomes of the decisions. Each branch splits into further decisions or the outcomes based on conditions or events.

In an exemplary embodiment, the enterprise decision intelligence model 126 uses a decision tree framework to map out the possible decision paths, where each path represents a sequence of decisions and the potential outcomes of the decisions. The decision paths are guided by the utility scores, which are determined by the utility function. At each decision node, the enterprise decision intelligence model 126 calculates the utility score for possible actions by analyzing their causal impact on relevant decision variables. The utility scores represent how favorable or valuable each outcome is in achieving the enterprise goals. By evaluating the utility of each decision path, the enterprise decision intelligence model 126 identifies the optimal recommendations. In an embodiment, the user 166 modifies or rejects the recommendations before execution of the recommendations in real-time. In another embodiment, the enterprise decision intelligence model 126 executes the recommendations autonomously without requiring manual intervention. This automated mode is particularly beneficial for time-sensitive or routine decisions, enabling faster responses to the real-time trends and operational needs.

The enterprise decision intelligence model 126 includes a low-rank adapter 160 that is used to fine-tune a subset of the decision-making parameters when the enterprise decision intelligence model 126 needs to be adapted to new scenarios or updated with the real-time data.

The enterprise decision intelligence model 126 utilizes a language model 162 to translate complex data associated with the decisions/recommendations into a human-readable format for better interpretation and communication. In an exemplary embodiment, the language model 162 utilizes natural language processing (NLP) techniques for creating summaries and recommendations of the decisions in a human-readable format.

The enterprise decision intelligence model 126 includes a text-to-speech engine 164 that provides voice-based outputs to the user 166 for user-friendly communication of the decisions/recommendations. In an exemplary embodiment, the text-to-speech engine 164 first analyzes a text of decision insights (i.e., recommendations) and segments the text into sentences. Further, the text-to-speech engine 164 identifies parts of speech, punctuation and syntactic structures to understand the context and pronunciation of words in the sentences. The text-to-speech engine 164 generates speech in a human-like voice to convey the decision insights (i.e., recommendations) in the form of an audio output to the user 166.

FIG. 1E illustrates the decision graph 154 employed within the system 102, according to certain embodiments. The decision graph 154 represents a complex intelligence type triggered by the analysis of, for example, opening a new store. The decision graph 154 structures a cross-intelligence framework as the DAG, where a site intelligence 168 may, for example, provide critical data about a store location, demographics, and other site-specific insights. The critical data may be used as input by the cross-intelligence block 170.

The cross-intelligence block 170 acts as a central hub that processes the input and coordinates multiple interconnected domain-specific blocks 136. The cross-intelligence block 170 integrates the insights received from the site intelligence 168 and communicates the decisions or the actions to multiple dependent modules such as the marketing intelligence module 150, the workforce scheduling intelligence module 148, and the inventory optimization module 146.

In an embodiment, the cross-intelligence block 170 triggers a series of marketing campaigns to the marketing intelligence module 150. In such embodiment, the cross-intelligence block 170 sequences the series of marketing campaigns using the insights received from the site intelligence 168. Further, the cross-intelligence block 170 notifies the workforce scheduling intelligence module 148 to prepare for peak load times based on marketing triggers. The cross-intelligence block 170 may also transmit the trigger to the inventory optimization module 146 to adjust, for example, the inventory stock levels to meet the projected demand from the marketing campaign. In an embodiment, the inventory optimization module 146 and the marketing intelligence module 150 inform the cross-intelligence block 170 about inventory constraints and marketing constraints, respectively, that may be considered while refining marketing strategies, inventory and workforce planning. The inventory constraints include a service level to cost ratio and holding and transfer cost for the service level. The service level to cost ratio refer to balancing the availability of products with the cost of storage and holding and transfer cost for the service level refers to managing the costs associated with storing products and transferring the inventory between locations.

For example, if the projected demand from the marketing campaign is high, the inventory optimization module 146 informs the cross-intelligence block 170 to optimize stock replenishment without overspending.

Further, the marketing constraints can include combo offers vs. sales uplift, sensitivity to combo offers on demographics, and so forth. The combo offers vs. sales uplift refers to assessing whether discounts lead to an actual increase in sales and revenue or reduce margins. The sensitivity to combo offers on demographics refers to how different demographic groups respond to the promotional offers on the products.

For example, if the combo offer is proposed, then the marketing intelligence module 150 may provide constraints such as ensuring sales uplift exceeds a threshold percentage or targeting only certain demographics to avoid overspending.

Figure 1F:
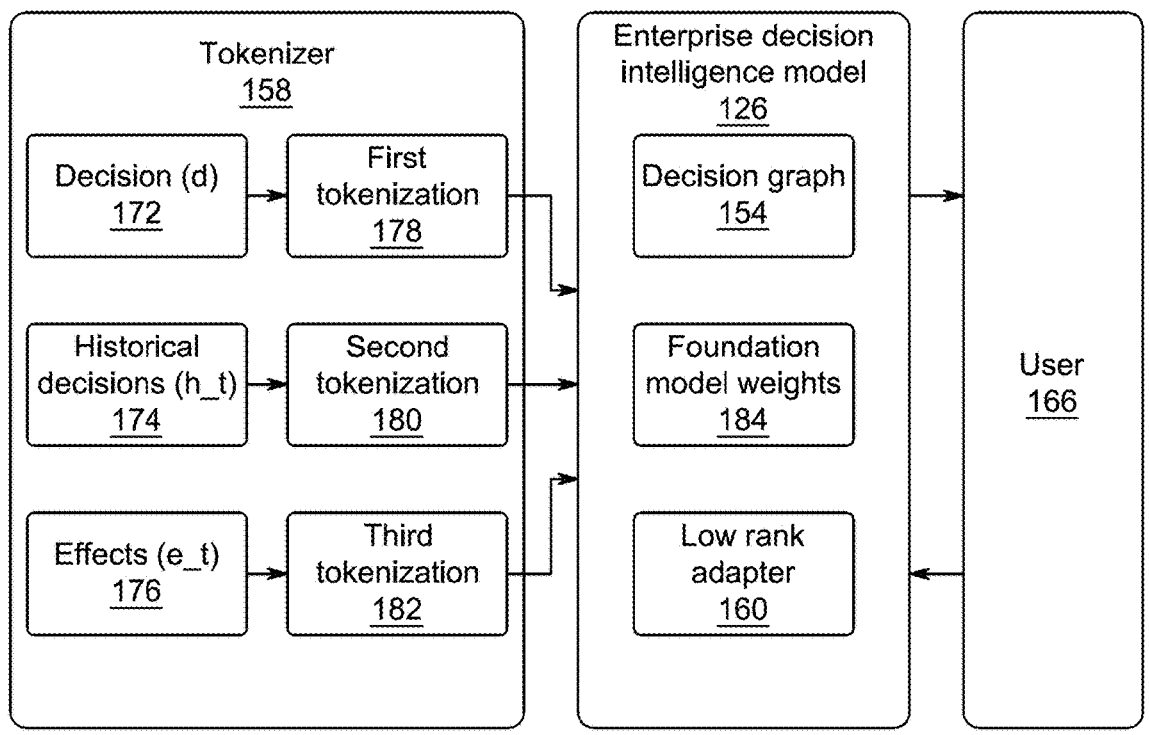
FIG. 1F illustrates a block diagram representing interactions between various components of an enterprise decision intelligence model, according to certain embodiments.

FIG. 1F illustrates a block diagram representing interactions between various components of the enterprise decision intelligence model 126, according to certain embodiments. As shown in FIG. 1F, the tokenizer 158 processes input data such as, decisions (d) 172, historical decisions (h_t) 174 and affects (e_t) 176 by converting the input data into a tokenized format that may be understandable by the enterprise decision intelligence model 126. In an exemplary embodiment, the decisions (d) 172 are current decisions received from the domain-specific blocks 136 (as shown in FIG. 1D). In an embodiment, a first tokenization 178 is performed on the decisions (d) 172 to integrate the decisions (d) 172 into the decision-making process. For example, the current decision may be "increase stock levels by 40% in Q4," and the tokenizer 158 may tokenize the sentence of the current decision into tokens such as, "increase," "stock," "level," "40%", "Q4". The tokens represent structured information for the enterprise decision intelligence model 126.

The historical decisions (h_t) 174 are past decisions on which a second tokenization 180 is performed for contextual understanding, allowing the enterprise decision intelligence model 126 to consider the past decisions when making new decisions. For example, the historical decision (h_t) 174 may be "reduced stock level by 20% in Q3" and the tokenizer 158 tokenizes the sentence of the historical decision (h_t) 174 into tokens such as, "reduced", "stock", "level", "20%", "Q4". The tokens represent the patterns from the past decisions.

The affects (e_t) 176 refer to impacts of the past decisions, on which a third tokenization 182 is performed to assess how the past decisions have influenced current conditions. For example, the affects (e_t) 176 may be "customer retention dropped by 10% in Q3 due to reduced stock levels" and the tokenizer 158 tokenizes the sentence of the affects (e_t) 176 into the tokens such as, "customer", "retention" "dropped" "10%", "reduced", "stock", "level", "Q3". The tokens represent the insights into the consequences of the past decisions.

The enterprise decision intelligence model 126 includes components such as the decision graph 154, foundation model weights 184 and the low-rank adapter 160. The decision graph 154 illustrates the interrelationship between the decisions, showing the dependencies and the impacts between various nodes of the decisions. For example, the decisions (d) 172 may be "increase stock levels by 40%" and "increase workforce by 10%". Based on the decisions (d) 172, the decision graph 154 may show a dependency that the increase in the stock level may lead to an increased need for the workforce.

The foundation model weights 184 are pre-defined parameters derived from a foundation model and are used to guide the decision-making process based on the decisions (d) 172. For example, the foundation model leverages foundational learning from datasets of similar enterprise domains such as, past enterprise decisions, market trends, and so forth. Based on the foundational learning, the foundation model suggests that the increasing stock levels in Q4 align with a higher seasonal demand.

The low-rank adapter 160 may fine-tune the behavior of the foundation model to specific requirements without retraining, optimizing the decision-making process based on the context provided. For example, the insights of the original model may be to increase the marketing spend by 5% to increase sales. However, based on the budget constraints of the organization, the low-rank adapter 160 adapts the decision to "optimize current marketing channels to increase the sales.

Upon processing the tokenized decisions (d) 172, the historical decisions (h_t) 174 and the affects (e_t) 176 through the decision graph 154 and adapting the decisions with the low-rank adapter 160, the enterprise decision intelligence model 126 generates the output of the context-aware recommendations and transmit the output to the user 166.

FIG. 1G illustrates an exemplary interface 114 displaying a response outputted from the enterprise decision intelligence model 126, according to certain embodiments. The enterprise decision intelligence model 126 generates the response to the query, for example, about finding the suitable location for the burger restaurant in south of Riyadh. The response provides context specific insights (e.g., a specific location based on demographic and commercial characteristics), data-driven recommendations (i.e., the specific location is provided with population data, demographics and transient population), competitive analysis and supporting data links. Hence, the response demonstrates the ability of enterprise decision intelligence model 126 to deliver actionable insights tailored to complex and context-rich enterprise queries, streamlining decision-making processes effectively.

Figure 2:
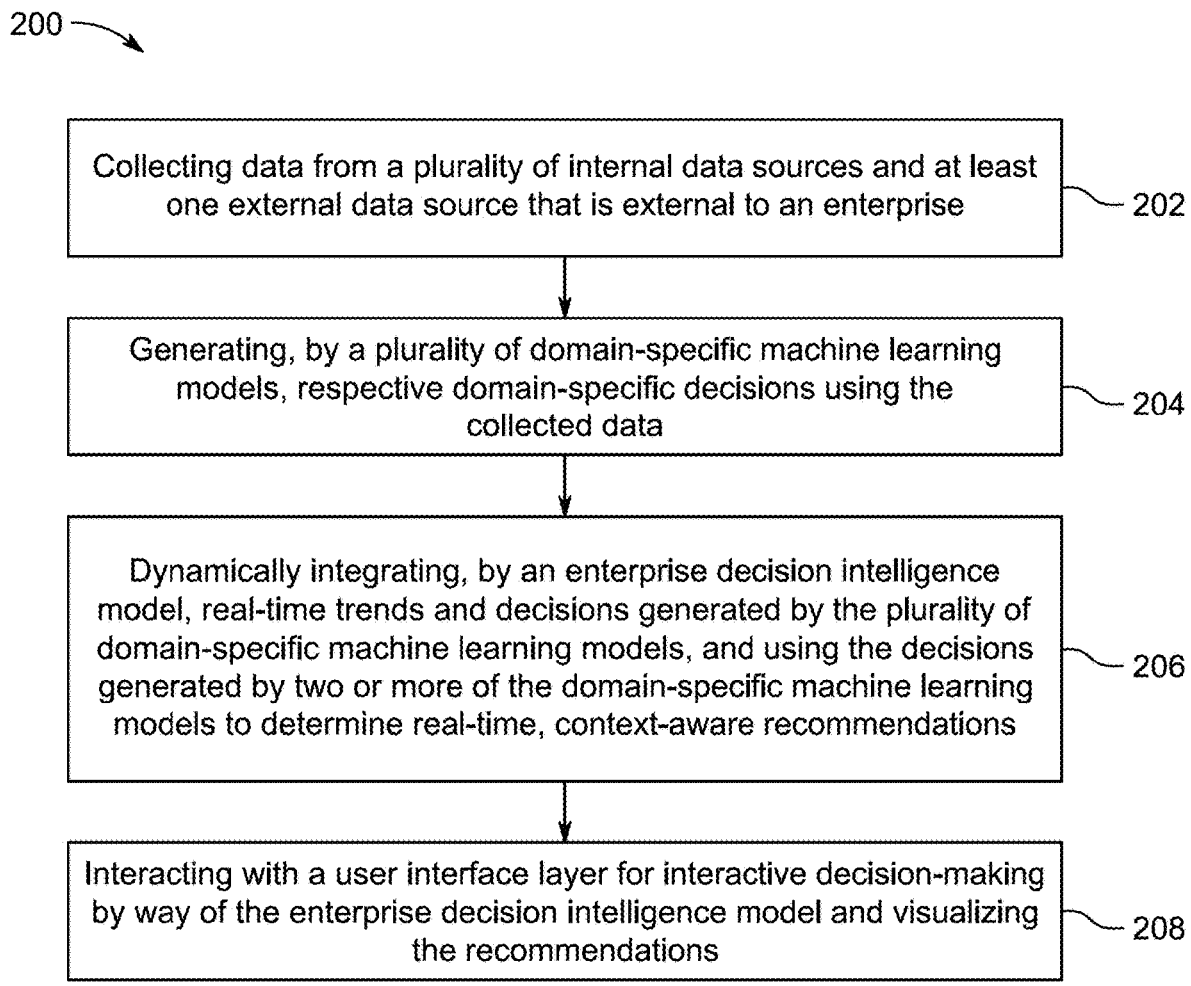
FIG. 2 illustrates a flowchart of a computer-implemented method of enterprise decision support, according to certain embodiments.

FIG. 2 illustrates a flowchart of a computer-implemented method 200 of enterprise decision support, according to certain embodiments. The method 200 includes a series of steps. These steps are only illustrative, and other alternatives may be considered where one or more steps are added, one or more steps are removed, or one or more steps are provided in a different sequence without departing from the scope of the present disclosure.

At step 202, the method 200 includes collecting the data from the internal data sources 140 and the at least one external data source 142. The at least one external data source is external to the enterprise. This step involves collecting the data from the internal data sources 140 and the external data sources 142 through the connectors. This step further involves establishing the connection with the internal data sources 140 and the external data sources 142 using the connectors. Upon establishing the connection, step 202 involves sending the request to the internal data sources 140 and the external data sources 142 through the connectors for collecting the data.

The method 200 may also include preprocessing the collected data to clean, normalize and fuse the data to maintain the quality and context of the data. The method 200 may also include extracting the domain-specific features, using the feature extraction techniques, from the collected data. Further, the method 200 includes transmitting the extracted domain-specific features to the corresponding domain-specific blocks 136.

At step 204, the method 200 includes generating, by the domain-specific machine learning models 124, respective domain-specific decisions using the collected data. The collected data includes the domain-specific features relevant to the corresponding domain-specific machine learning models 124. This step involves applying the learned patterns to analyze the domain-specific features for generating the domain-specific decisions. The domain-specific machine learning models 124 include the demand forecasting module 144, the inventory optimization module 146, the workforce scheduling intelligence module 148, the marketing intelligence module 150, and the risk management module 152. Step 204 further involves performing machine learning in the inventory optimization module 146 to identify the optimal inventory levels based on the storage costs, the lead times, and the demand forecasts.

At step 206, the method 200 includes dynamically integrating, by the enterprise decision intelligence model 126, the real-time trends and the decisions generated by the domain-specific machine learning models 124, and using the decisions generated by two or more of the domain-specific machine learning models 124 to determine the real-time, context-aware recommendations. The real-time trends may be determined from the continuous stream of the real-time data collected from the internal data sources 140 and the external data sources 142. The collected real-time data may be analyzed by using the machine learning models to identify the real-time trends. This step involves tokenizing, by the tokenizer 158, the domain-specific decisions into smaller and manageable tokens. By tokenizing the decisions, the enterprise decision intelligence model 126 may be able to interpret and combine the decisions into the unified format. Further, this step involves evaluating the combined decisions based on the current enterprise conditions (i.e., external factors), such as the real-time trends, to generate the context-aware recommendations that are actionable and relevant.

The enterprise decision intelligence model 126 maintains the decision graph 154 that relates the decision variables of the domain-specific machine learning models 124 in the causal relationship and the domain-specific machine learning models 124 operate as the interconnected network based on the decision graph 154. The decision graph 154 structures the cross-intelligence (interaction) as the DAG. For example, when the risk management module 152 detects a supply chain risk, the cross-intelligence block 170 alerts the inventory optimization module 146 to adjust the inventory levels. Also, the cross-intelligence block 170 enables the domain-specific machine learning models 124 to function as the interconnected network, ensuring that every decision considers potential impacts across organizational functions. For example, the demand forecasting module 144 generates the demand decision that affects actions in the inventory optimization module 146 by transmitting forecast insights and necessary inventory adjustments in accordance with the decision graph 154.

In an embodiment, the method 200 may include utilizing the structure learning techniques, by the enterprise decision intelligence model 126, to discover and update the decision graph 154 continuously. The method 200 may further include determining the affects of the decision variables using causal inference techniques, where the domain-specific machine learning models 124 generate the decisions based on the affects of the decision variables from other domain-specific machine learning models 124.

The method 200 further includes a step of performing, by the enterprise decision intelligence model 126, the utility function that defines the criteria that the outcome of the decision is optimized by a decision intelligence module. The method 200 further includes a step of assessing, using algorithms for the utility function performed by the enterprise decision intelligence model 126, the expected utility in terms of the enterprise goals, and simulating potential scenarios to optimize the decision policies. This step involves evaluating and optimizing the outcomes of the decisions in alignment with the enterprise goals by using the algorithms. This step further includes identifying the decision policy that maximizes the expected utility by simulating multiple scenarios. By simulating multiple decision paths, the enterprise decision intelligence model 126 assesses their respective impacts on the utility function and identifies the optimal decision policy.

The method 200 further includes a step of mapping out, by the enterprise decision intelligence model 126, the decision paths by the decision tree, guided by the utility scores determined by the utility function, for generation of the optimal recommendations. This step may involve utilizing the decision tree framework to map out the possible decision paths, where each path represents the sequence of decisions and the potential outcomes of the decisions. The decision paths are guided by the utility scores determined by the utility function. This step further involves calculating, by the enterprise decision intelligence model 126, the utility score at each decision node, for possible actions by analyzing their causal impact on relevant decision variables. This step further involves evaluating the utility of each decision path to identify the optimal recommendations.

The method 200 further includes capturing, by the enterprise decision intelligence model 126, including a self-learning system 130 having a feedback loop, the outcomes of the decisions by the domain-specific machine learning models 124, and using, by the enterprise decision intelligence model 126, the captured outcomes to refine the model parameters of the domain-specific machine learning models 124. This step involves tracking the actual outcome of the generated decisions and comparing the actual outcome with an expected outcome. This step further involves refining the parameters of the corresponding domain-specific machine learning models 124 if the actual outcome deviates from the expected outcome.

The method 200 also includes detecting, by the infrastructure layer 120, the data drift in the collected data and retraining the domain-specific machine learning models 124. This step involves detecting the data drift in the collected data by using the monitoring tools such as, Prefect, Machine Learning (ML) Flow, and so forth. This step further involves comparing the collected data to the historical data distribution by using the statistical methods and detecting the data drift in the collected data if the collected data deviates from the historical data distribution. This step further involves triggering the retraining process for the affected domain-specific machine learning models 124 to retrain if the data drift is detected in the collected data. This step further involves retraining the affected domain-specific machine learning models 124 by collecting the updated data from the internal data sources 140 and the external data sources 142.

At step 208, the method 200 includes interacting with the user interface layer 128 for interactive decision-making by way of the enterprise decision intelligence model 126 and visualizing the recommendations. The method 200 also includes a step of entering, by the user interface layer 128, any overrides for operation of the enterprise decision intelligence model 126 to override decisions by specific ones of the domain-specific machine learning models 124. For example, the user 166 may have the ability to modify or reject the recommendations generated by the enterprise decision intelligence model 126 before execution of the recommendations in real-time.

The first embodiment is illustrated with respect to FIG. 1C-FIG. 1G. The first embodiment discloses the enterprise decision support system 102. The system 102 includes a processing circuitry 118 configured with a data consolidation module 138 to collect data from different internal data sources 140 and at least one external data source 142 that is external to an enterprise. The processing circuitry 118 is further configured with domain-specific machine learning models 124 to generate respective domain-specific decisions using the collected data. The processing circuitry 118 is further configured with an enterprise decision intelligence model 126 that dynamically integrates real-time trends and the decisions generated by the plurality of domain-specific machine learning models 124 and uses the decisions generated by two or more of the domain-specific machine learning models 124 to determine real-time, context-aware recommendations. The enterprise decision intelligence model 126 maintains a decision graph 154 that relates decision variables of the domain-specific machine learning models 124 in a causal relationship. The domain-specific machine learning models 124 operate as an interconnected network based on the decision graph 154. The domain-specific machine learning models 124 generate the respective domain-specific decisions based on the effects of the decision variables from other domain-specific machine learning models 124. The processing circuitry 118 is further configured with a user interface layer 128 for interactive decision-making by way of the enterprise decision intelligence model 126 and visualizing the recommendations.

In an aspect, the enterprise decision intelligence model 126 is configured to perform a utility function that defines criteria that an outcome of a decision is optimized by a decision intelligence module.

In an aspect, the enterprise decision intelligence model 126 includes algorithms for the utility function that are used to assess an expected utility in terms of enterprise goals, and simulates potential scenarios to optimize decision policies.

In an aspect, the enterprise decision intelligence model 126 maps out decision paths by a decision tree, guided by utility scores determined by the utility function, for generation of optimal recommendations.

In an aspect, the system 102 further includes an infrastructure layer 120 configured to detect data drift in the collected data and retrain the domain-specific machine learning models 124.

In an aspect, the domain-specific machine learning models 124 includes a demand forecasting module 144, an inventory optimization module 146 and a workforce scheduling intelligence module 148. The inventory optimization module 146 uses the domain-specific machine learning models 124 to identify optimal inventory levels based on storage costs, lead times, and demand forecasts. The demand forecasting module 144 generates a demand decision that affects actions in the inventory optimization module 146 by transmitting forecast insights and necessary inventory adjustments in accordance with the decision graph 154.

In an aspect, the domain-specific machine learning models 124 includes a demand forecasting module 144, a marketing intelligence module 150, and an inventory optimization module 146. The domain-specific machine learning models 124 generate the decisions, including when the marketing intelligence module 150 generates a decision to increase marketing spending, the enterprise decision intelligence model 126 estimates a causal effect of the decision to increase the marketing spending on demand and inventory levels in the demand forecasting module 144 and the inventory optimization module 146, respectively.

In an aspect, the domain-specific machine learning models 124 includes a risk management module 152 and an inventory optimization module 146. When the risk management module 152 detects a supply chain risk, it alerts the inventory optimization module 146 to adjust inventory levels.

In an aspect, the enterprise decision intelligence model 126 includes a self-learning system 130 having a feedback loop that captures outcomes of decisions by the domain-specific machine learning models 124. The enterprise decision intelligence model 126 uses the captured outcomes to refine model parameters of the domain-specific machine learning models 124.

In an aspect, the user interface layer 128 includes an interface 114 for entering overrides for operation of the enterprise decision intelligence model 126 to override decisions by specific ones of the plurality of domain-specific machine learning models 124.

The second embodiment is illustrated with respect to FIG. 1C-FIG. 2. The second embodiment discloses the computer-implemented method 200 of enterprise decision support. The method 200 includes collecting data from a plurality of internal data sources 140 and at least one external data source 142 that is external to an enterprise. The method 200 further includes generating, by a plurality of domain-specific machine learning models 124, respective domain-specific decisions using the collected data. The method 200 further includes dynamically integrating, by an enterprise decision intelligence model 126, real-time trends and decisions generated by the plurality of domain-specific machine learning models 124, and using the decisions generated by two or more of the domain-specific machine learning models 124 to determine real-time, context-aware recommendations. The enterprise decision intelligence model 126 maintains a decision graph 154 that relates decision variables of the domain-specific machine learning models 124 in a causal relationship and the domain-specific machine learning models 124 operate as an interconnected network based on the decision graph 154. The domain-specific machine learning models 124 generate the decisions based on effects of the decision variables from other domain-specific machine learning models 124. The method 200 further includes interacting with a user interface layer 128 for interactive decision-making by way of the enterprise decision intelligence model 126 and visualizing the recommendations.

In an aspect, the method 200 further includes performing, by the enterprise decision intelligence model 126, a utility function that defines criteria that an outcome of a decision is optimized by a decision intelligence module.

In an aspect, the method 200 further includes assessing, using algorithms for the utility function performed by the enterprise decision intelligence model 126, an expected utility in terms of enterprise goals, and simulating potential scenarios to optimize decision policies.

In an aspect, the method 200 further includes mapping out, by the enterprise decision intelligence model 126, decision paths by a decision tree, guided by utility scores determined by the utility function, for generation of optimal recommendations.

In an aspect, the method 200 further includes detecting, by an infrastructure layer 120, data drift in the collected data and retraining the domain-specific machine learning models 124.

In an aspect, the domain-specific machine learning models 124 includes a demand forecasting module 144, an inventory optimization module 146 and a workforce scheduling intelligence module 148. The method 200 includes performing machine learning in the inventory optimization module 146 to identify optimal inventory levels based on storage costs, lead times, and demand forecasts. The method 200 further includes generating, by the demand forecasting module 144, a demand decision that affects actions in the inventory optimization module 146 by transmitting forecast insights and necessary inventory adjustments in accordance with the decision graph 154.

In an aspect, the domain-specific machine learning models 124 includes a demand forecasting module 144, a marketing intelligence module 150, and an inventory optimization module 146. The method 200 includes generating, by the domain-specific machine learning models 124, the decisions including when the marketing intelligence module 150 generates a decision to increase marketing spending, the enterprise decision intelligence model 126 estimates a causal effect of the decision to increase the marketing spending on demand and inventory levels in the demand forecasting module 144 and the inventory optimization module 146, respectively.

In an aspect, the domain-specific machine learning models 124 includes a risk management module 152 and an inventory optimization module 146. The method 200 may, for example, further includewhen the risk management module 152 detects a supply chain risk, it alerts the inventory optimization module 146 to adjust inventory levels.

In an aspect, the method 200 further includes capturing, by the enterprise decision intelligence model 126 including a self-learning system 130 having a feedback loop, outcomes of decisions by the domain-specific machine learning models 124, and using, by the enterprise decision intelligence model 126, the captured outcomes to refine model parameters of the domain-specific machine learning models 124.

In an aspect, the method 200 further includes entering, by the user interface layer 128, overrides for operation of the enterprise decision intelligence model 126 to override decisions by specific ones of the plurality of domain-specific machine learning models 124.

Figure 3:
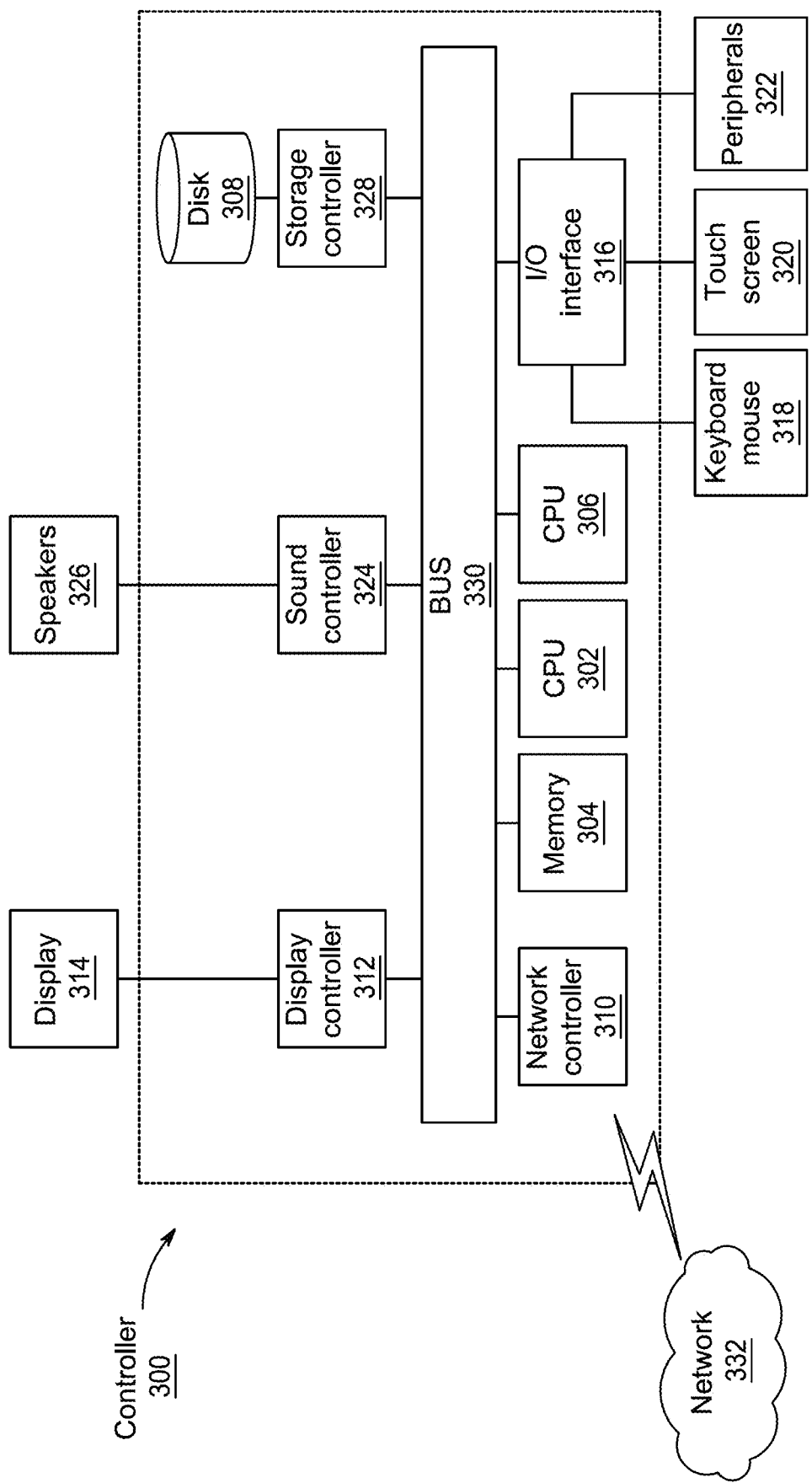
FIG. 3 is an illustration of a non-limiting example of details of computing hardware used in a computing system, according to certain embodiments.

Next, further details of the hardware description of the computing environment according to exemplary embodiments are described with reference to FIG. 3. In FIG. 3, a controller 300 is described as representative of the system 102 of FIG. 1C in which the controller 300 is a processing circuitry 118 which includes a CPU 302 which performs the processes described above/below. The process data and instructions may be stored in a memory 304. These processes and instructions may also be stored on a storage medium disk 308 such as a hard drive (HDD) or a portable storage medium or may be stored remotely.

Further, the present disclosure is not limited by the form of the computer-readable media on which the instructions of the inventive process are stored. For example, the instructions may be stored on compact discs (CDs), digital versatile disc (DVDs), in FLASH memory, read access memory (RAM), read only memory (ROM), programmable read only memory (PROM), erasable programmable read only memory (EPROM), electrically erasable programmable read only memory (EEPROM), hard disk or any other information processing device with which the computing device communicates, such as a server or computer.

Further, the present disclosure is provided as a utility application, background daemon, or component of an operating system, or combination thereof, executing in conjunction with CPU 302, 306 and an operating system such as Microsoft Windows 7, Microsoft Windows 10, UNiplexed Information Computing System (UNIX), Solaris, Lovable Intellect Not Using XP (LINUX), Apple Macintosh (MAC)-Operating System (OS) and other systems known to those skilled in the art.

The hardware elements in order to achieve the computing device may be realized by various circuitry elements, known to those skilled in the art. For example, CPU 302 or CPU 306 may be a Xenon or Core processor from Intel of America or an Opteron processor from advanced micro devices (AMD) of America, or may be other processor types that would be recognized by one of ordinary skill in the art. Alternatively, the CPU 302, 306 may be implemented on a field programmable Gate array (FPGA), application-specific integrated circuit (ASIC), programmable logic device (PLD) or using discrete logic circuits, as one of ordinary skill in the art would recognize. Further, CPU 302, 306 may be implemented as multiple processors cooperatively working in parallel to perform the instructions of the inventive processes described above.

The computing device in the FIG. 3 also includes a network controller 310, such as an Intel Ethernet PRO network interface card from Intel Corporation of America, for interfacing with network 332. As can be appreciated, the network 332 can be a public network, such as the Internet, or a private network such as a local area network (LAN) or a wide area network (WAN) network, or any combination thereof and can also include public switched telephone network, (PSTN) or an integrated services digital network (ISDN) sub-network. The network 332 can also be wired, such as an Ethernet network, or can be wireless such as a cellular network including EDGE, 3G and 4G wireless cellular systems. The wireless network can also be Wireless Fidelity (WiFi), Bluetooth, or any other wireless form of communication that is known.

The computing device further includes a display controller 312, such as a NVIDIA GeForce GTX or Quadro graphics adaptor from NVIDIA Corporation of America for interfacing with display 314, such as a Hewlett Packard HPL2445w LCD monitor. A general purpose I/O interface 316 interfaces with a keyboard and/or mouse 318 as well as a touch screen panel 320 on or separate from display 314. General purpose I/O interface also connects to a variety of peripherals 322 including printers and scanners, such as an OfficeJet or DeskJet from Hewlett Packard.

A sound controller 324 is also provided in the computing device such as Sound Blaster X-Fi Titanium from Creative, to interface with speakers/microphone 326 thereby providing sounds and/or music.

The general-purpose storage controller 328 connects the storage medium disk 308 with communication bus 330, which may be an instruction set architecture (ISA), extended industry standard architecture (EISA), video electronics standards association (VESA), peripheral component interconnect (PCI), or similar, for interconnecting all of the components of the computing device. A description of the general features and functionality of the display 314, keyboard and/or mouse 318, as well as the display controller 312, storage controller 328, network controller 310, sound controller 324, and general purpose I/O interface 316 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 4.

Figure 4:
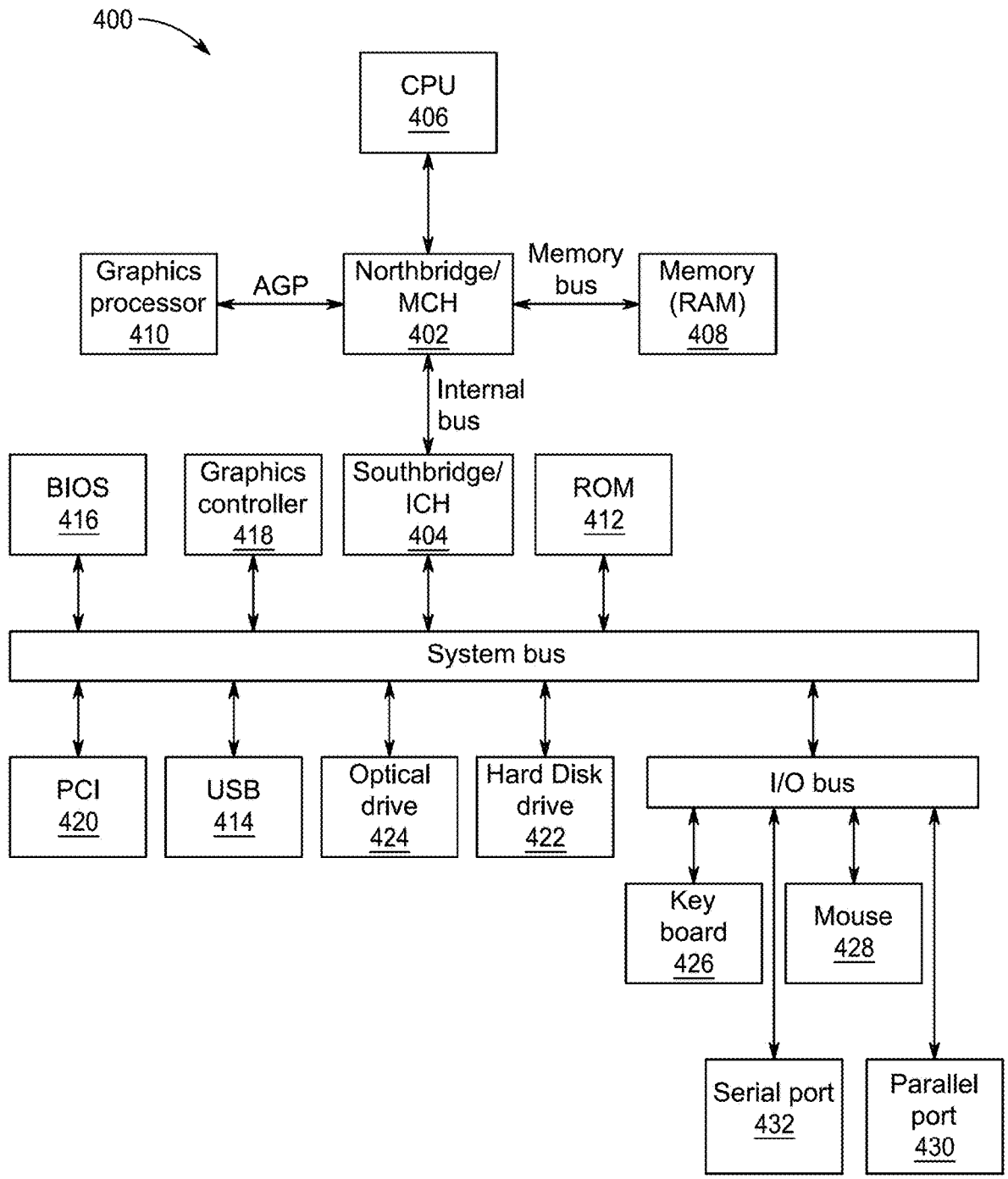
FIG. 4 is an exemplary schematic diagram of a data processing system used within the computing system, according to certain embodiments.

FIG. 4 is an exemplary schematic diagram of a data processing system 400 used within the computing system, according to certain embodiments, for performing the functions of the exemplary embodiments. The data processing system 400 is an example of a computer in which code or instructions implementing the processes of the illustrative embodiments may be located.

In the FIG. 4, the data processing system 400 employs a hub architecture including a north bridge and memory controller hub (NB/MCH) 402 and a south bridge and input/output (I/O) controller hub (SB/ICH) 404. The central processing unit (CPU) 406 is connected to the NB/MCH 402. The NB/MCH 402 also connects to the memory 408 via a memory bus, and connects to the graphics processor 410 via an accelerated graphics port (AGP). The NB/MCH 402 also connects to the SB/ICH 404 via an internal bus (e.g., a unified media interface or a direct media interface). The CPU 406 may contain one or more processors and even may be implemented using one or more heterogeneous processor systems.

Figure 5:
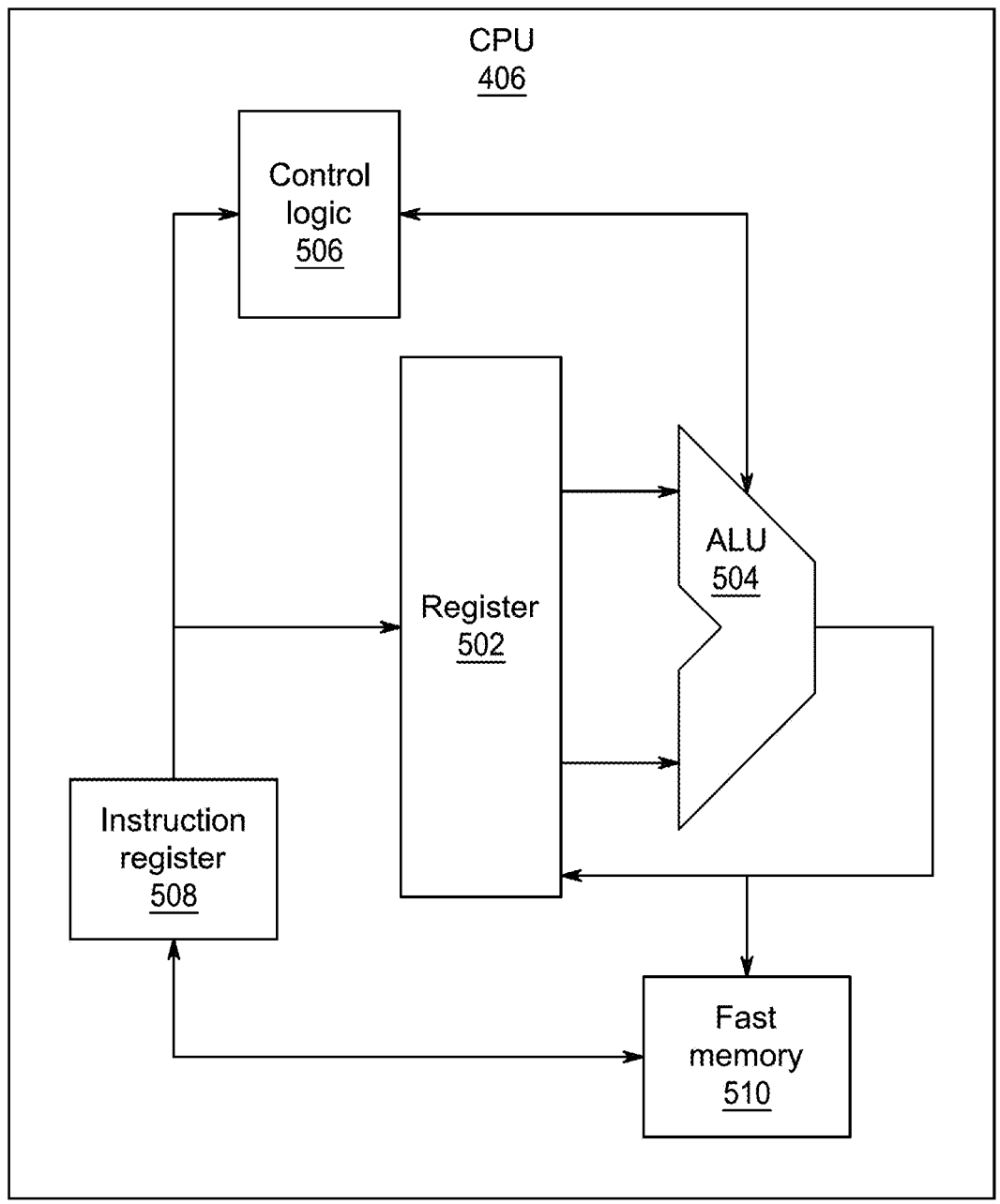
FIG. 5 is an exemplary schematic diagram of a processor used with the computing system, according to certain embodiments.

For example, FIG. 5 shows one implementation of the CPU 406. In one implementation, the instruction register 508 retrieves instructions from the fast memory 510. At least part of these instructions is fetched from the instruction register 508 by the control logic 506 and interpreted according to the instruction set architecture of the CPU 406. Part of the instructions can also be directed to the register 502. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 504 that loads values from the register 502 and performs logical and mathematical operations on the loaded values according to the instructions. The results from these operations can be feedback into the register 502 and/or stored in the fast memory 510. According to certain implementations, the instruction set architecture of the CPU 406 can use a reduced instruction set architecture, a complex instruction set architecture, a vector processor architecture, a very large instruction word architecture. Furthermore, the CPU 406 can be based on a Von Neuman model or a Harvard model. The CPU 406 can be a digital signal processor, the FPGA, the ASIC, the PLA, a PLD, or a CPLD. Further, the CPU 406 can be an x86 processor by Intel or by AMD; an ARM processor, a Power architecture processor by, e.g., IBM; a SPARC architecture processor by Sun Microsystems or by Oracle; or other known CPU architecture.

Referring again to the FIG. 4, the data processing system 400 can include that the SB/ICH 404 is coupled through a system bus to an I/O Bus, a read only memory (ROM) 412, universal serial bus (USB) port 414, a flash binary input/output system (BIOS) 416, and a graphics controller 418. PCI/PCIe devices can also be coupled to SB/ICH 404 through a PCI bus 420.

The PCI devices may include, for example, Ethernet adapters, add-in cards, and PC cards for notebook computers. The Hard disk drive 422 and CD-ROM (optical drive) 424 can use, for example, an integrated drive electronics (IDE) or serial advanced technology attachment (SATA) interface. In one implementation the I/O bus can include a super I/O (SIO) device.

Further, the hard disk drive (HDD) 422 and optical drive 424 can also be coupled to the SB/ICH 404 through a system bus. In one implementation, a keyboard 426, a mouse 428, a parallel port 430, and a serial port 432 can be connected to the system bus through the I/O bus. Other peripherals and devices that can be connected to the SB/ICH 404 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 6:
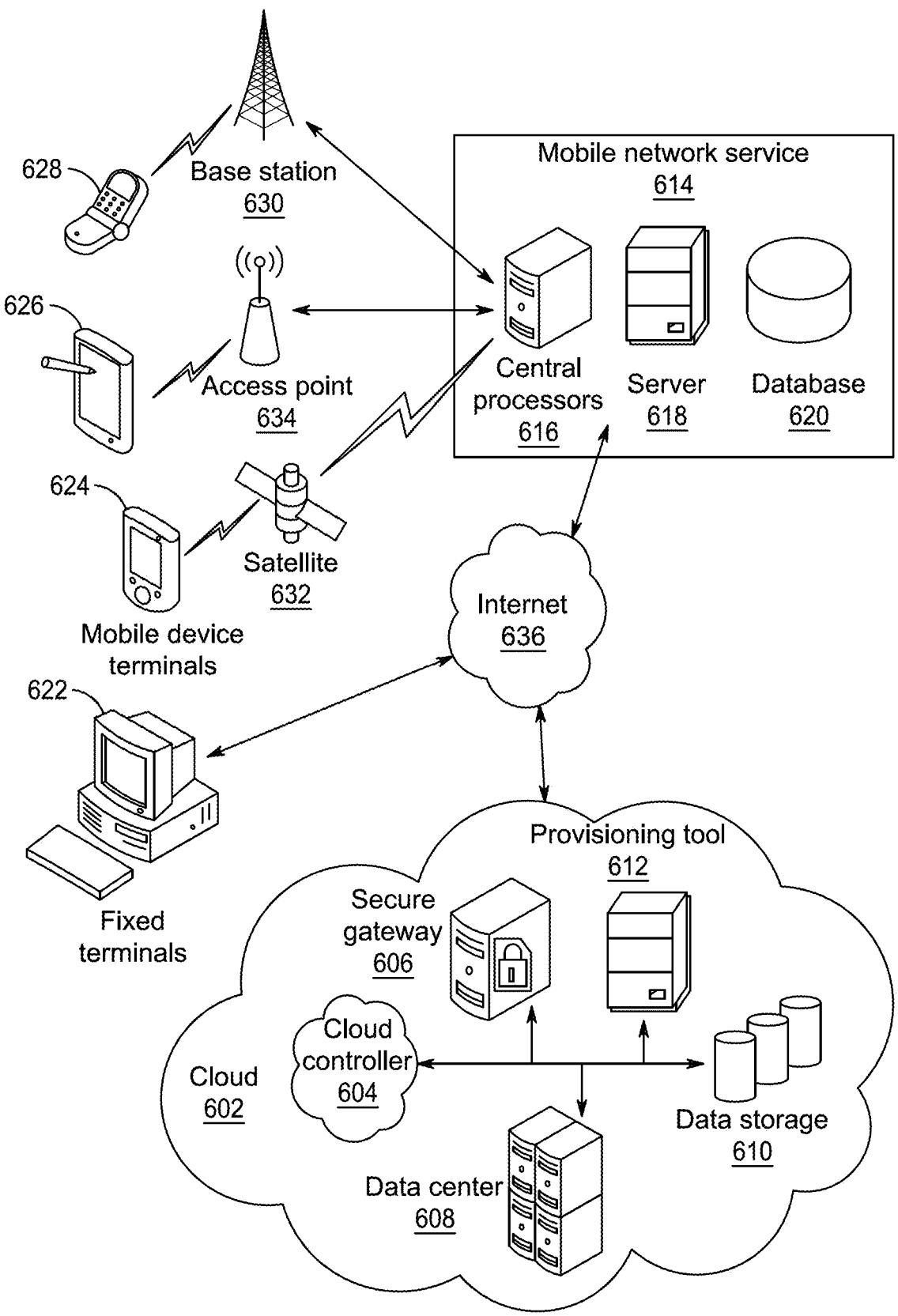
FIG. 6 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 602 including a cloud controller 604, a secure gateway 606, a data center 608, data storage 610 and a provisioning tool 612, and mobile network services 614 including central processors 616, a server 618 and a database 620, which may share processing, as shown by FIG. 6, in addition to various human interface and communication devices (e.g., display monitors 622, smart phones 624, tablets 626, personal digital assistants (PDAs) 628). The network may be a private network, such as a base station 630, satellite 632 or access point 634, or be a public network, may such as the Internet 636. Input to the system may be received via direct user input and received remotely either in real-time or as a batch process. Additionally, some implementations may be performed on modules or hardware that are not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A decision support system for an enterprise, comprising:
   server processing circuitry configured with
   a data consolidation module to collect data from a plurality of internal data sources and at least one external data source that is external to the enterprise;
   a plurality of domain-specific machine learning models to generate respective domain-specific outputs using the collected data;
   an enterprise decision intelligence model that dynamically incorporates real-time trends and outputs from the plurality of domain-specific machine learning models, and leveraging the outputs from at least two of the domain-specific machine learning models to generate real-time, context-aware recommendations, wherein the enterprise decision intelligence model utilizes a decision graph to establish causal relationships between decision variables of the domain-specific machine learning models, enabling the domain-specific machine learning models to operate as an interconnected network guided by the decision graph, wherein the domain-specific machine learning models generate the respective domain-specific decisions based on effects of the decision variables from other domain-specific machine learning models;

a computing device having a user interface layer that facilitates interactive decision-making through the enterprise decision intelligence model and enables visualization of the recommendations, wherein the user interface layer includes an interface for entering overrides for operation of the enterprise decision intelligence model to override a decision by a selected one of the plurality of domain-specific machine learning models; and a network connecting the server processing circuitry and the computing device so that the interactive-decision making is performed based on the enterprise decision intelligence model of the server processing circuitry, wherein the enterprise decision intelligence model is configured to perform a utility function that defines criteria that an outcome of a decision is optimized by a decision intelligence module, wherein the enterprise decision intelligence model is configured to map out decision paths by a decision tree, guided by utility scores determined by the utility function, for generation of optimal recommendations, wherein the enterprise decision intelligence model includes a self-learning system having a feedback loop that captures outcomes of decisions by the domain-specific machine learning models, wherein the enterprise decision intelligence model is configured to track the captured outcomes to determine whether the decisions led to the captured outcomes, compare the tracked captured outcomes with an expected outcome, when the enterprise decision intelligence model determines that a captured outcome deviates from the expected outcome, then the enterprise decision intelligence model refines parameters of the corresponding domain-specific machine learning model, and generate a refined decision using the refined domain-specific machine learning model to make an adjustment to the outcome based on the captured outcome deviated from the expected outcome.

2. The system of claim 1, wherein the enterprise decision intelligence model includes an algorithm for the utility function that is used to assess an expected utility in terms of enterprise goals, and simulates potential scenarios to optimize decision policies.

3. The system of claim 1, further comprising an infrastructure layer configured to detect data drift in the collected data and retrain the domain-specific machine learning models.

4. The system of claim 1, wherein the plurality of domain-specific machine learning models includes a demand forecasting module, an inventory optimization module and a workforce scheduling intelligence module, wherein the inventory optimization module uses the domain-specific machine learning models to identify optimal inventory levels based on storage costs, lead times, and demand forecasts, and wherein the demand forecasting module generates a demand decision that effects actions in the inventory optimization module by transmitting forecast insights and necessary inventory adjustments in accordance with the decision graph.

5. The system of claim 1, wherein the plurality of domain-specific machine learning models includes a demand forecasting module, a marketing intelligence module, and an inventory optimization module, wherein the domain-specific machine learning models generate the decisions including when the marketing intelligence module generates a decision to increase marketing spending, the enterprise decision intelligence model estimates a causal effect of the decision to increase the marketing spending on demand and inventory levels in the demand forecasting module and the inventory optimization module, respectively.

6. The system of claim 1, wherein the plurality of domain-specific machine learning models includes a risk management module and an inventory optimization module, wherein when the risk management module detects a supply chain risk, it alerts the inventory optimization module to adjust inventory levels.

7. The system of claim 1, wherein the user interface layer includes an interface for entering overrides for operation of the enterprise decision intelligence model to override decisions by specific ones of the plurality of domain-specific machine learning models.

8. The system of claim 1, wherein the interface for entering overrides includes an interface for modifying or rejecting recommendations generated by the enterprise decision intelligence model before execution of the recommendations in real-time.

9. The system of claim 1, wherein the self-learning system uses real-time data monitoring tools to track Key Performance Indicators (KPIs) including sales figures, inventory levels, and production efficiency of the decision for capturing the outcomes of the decisions.

10. A computer-implemented method of decision support for an enterprise, comprising:

collecting data from a plurality of internal data sources and at least one external data source that is external to the enterprise;

generating, by a plurality of domain-specific machine learning models, respective domain-specific outputs using the collected data;

dynamically incorporating, by an enterprise decision intelligence model, real-time trends and the outputs from the plurality of domain-specific machine learning models, and leveraging the outputs from at least two of the domain-specific machine learning models to generate real-time, context-aware recommendations, wherein the enterprise decision intelligence model utilizes a decision graph to establish causal relationships between decision variables of the domain-specific machine learning models, enabling the domain-specific machine learning models to operate as an interconnected network guided by the decision graph, wherein the domain-specific machine learning models generate the decisions based on effects of the decision variables from other domain-specific machine learning models; and interacting with a user interface layer that facilitates interactive decision-making through the enterprise decision intelligence model and enables visualization of the recommendations, entering, by the user interface layer, overrides for operation of the enterprise decision intelligence model to override a decision by a selected one of the plurality of domain-specific machine learning models, performing, by the enterprise decision intelligence model, a utility function that defines criteria that an outcome of a decision is optimized by a decision intelligence module, mapping out, by the enterprise decision intelligence model, decision paths by a decision tree, guided by utility scores determined by the utility function, for generation of optimal recommendations, wherein the enterprise decision intelligence model includes a self-learning system having a feedback loop that captures outcomes of decisions by the domain-specific machine learning models, further comprising, tracking the captured outcomes to determine whether the decisions led to the captured outcomes, comparing the tracked captured outcomes with an expected outcome, when the enterprise decision intelligence model determines that a captured outcome deviates from the expected outcome, refining parameters of the corresponding domain-specific machine learning model, and generating a refined decision using the refined domain-specific machine learning model to make an adjustment to the outcome based on the captured outcome deviated from the expected outcome.

11. The method of claim 1, further comprising
assessing, using an algorithm for the utility function performed by the enterprise decision intelligence model, an expected utility in terms of enterprise goals, and simulating potential scenarios to optimize decision policies.

12. The method of claim 10, further comprising
detecting, by an infrastructure layer, data drift in the collected data and retraining the domain-specific machine learning models.

13. The method of claim 10, wherein the plurality of domain-specific machine learning models includes a demand forecasting module, an inventory optimization module and a workforce scheduling intelligence module, the method further comprising:
performing machine learning in the inventory optimization module to identify optimal inventory levels based on storage costs, lead times, and demand forecasts, and
generating, by the demand forecasting module, a demand decision that effects actions in the inventory optimization module by transmitting forecast insights and necessary inventory adjustments in accordance with the decision graph.

14. The method of claim 10, wherein the plurality of domain-specific machine learning models includes a demand forecasting module, a marketing intelligence module, and an inventory optimization module, the method further comprising
generating, by the domain-specific machine learning models, the decisions including when the marketing intelligence module generates a decision to increase marketing spending, the enterprise decision intelligence model estimates a causal effect of the decision to increase the marketing spending on demand and inventory levels in the demand forecasting module and the inventory optimization module, respectively.

15. The method of claim 10, wherein the plurality of domain-specific machine learning models includes a risk management module and an inventory optimization module, the method further comprising when the risk management module detects a supply chain risk, it alerts the inventory optimization module to adjust inventory levels.

16. The method of claim 10, further comprising
entering, by the user interface layer, overrides for operation of the enterprise decision intelligence model to override decisions by specific ones of the plurality of domain-specific machine learning models.

17. The method of claim 10, further comprising
modifying or rejecting recommendations generated by the enterprise decision intelligence model before execution of the recommendations in real-time.

18. The method of claim 10, further comprising
tracking, using real-time data monitoring tools, Key Performance Indicators (KPIs) including sales figures, inventory levels, and production efficiency of the decision for capturing the outcomes of the decisions.

* * * * *